US009250458B2

(12) United States Patent
Otsu et al.

(10) Patent No.: US 9,250,458 B2
(45) Date of Patent: Feb. 2, 2016

(54) SPATIAL LIGHT MODULATOR, AND SPATIAL LIGHT MODULATING METHOD

(75) Inventors: Tomoko Otsu, Hamamatsu (JP); Naoya Matsumoto, Hamamatsu (JP); Yuu Takiguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 128 days.

(21) Appl. No.: 13/985,083

(22) PCT Filed: Feb. 10, 2012

(86) PCT No.: PCT/JP2012/053168
§ 371 (c)(1),
(2), (4) Date: Oct. 7, 2013

(87) PCT Pub. No.: WO2012/111569
PCT Pub. Date: Aug. 23, 2012

(65) Prior Publication Data
US 2014/0022474 A1 Jan. 23, 2014

(30) Foreign Application Priority Data
Feb. 15, 2011 (JP) ................. P2011-029915

(51) Int. Cl.
*G02F 1/133* (2006.01)
*G09G 3/36* (2006.01)

(52) U.S. Cl.
CPC .......... *G02F 1/13306* (2013.01); *G09G 3/3611* (2013.01); *G02F 2203/12* (2013.01); *G02F2203/50* (2013.01); *G09G 2320/0285* (2013.01); *G09G 2320/041* (2013.01); *G09G 2360/145* (2013.01)

(58) Field of Classification Search
CPC .......... G02F 1/13306; G02F 1/133382; G02F 2203/12; G02F 2203/50; G02F 2203/60; G02F 2203/21; G09G 3/3611; G09G 2320/041; G09G 2320/0285; G09G 2360/145; G09G 3/3648

USPC ............................................. 349/72; 345/101
See application file for complete search history.

(56) References Cited

U.S. PATENT DOCUMENTS 5,151,814 A * 9/1992 Grinberg et al. ............ 359/209.1
6,313,821 B1 * 11/2001 Mizuno ......................... 345/101
(Continued)

FOREIGN PATENT DOCUMENTS

CN 1703650 11/2005
CN 101051488 10/2007
(Continued)

OTHER PUBLICATIONS

English-language translation of International Preliminary Report on Patentability (IPRP) dated Aug. 29, 2013 that issued in WO Patent Application No. PCT/JP2012/053169.
(Continued)

*Primary Examiner* — Edward Glick
*Assistant Examiner* — David Chung
(74) *Attorney, Agent, or Firm* — Drinker Biddle & Reath LLP

(57) ABSTRACT

A spatial light modulation device includes a liquid crystal layer modulating a phase of incident light according to a level of an applied electric field, a temperature sensor generating a temperature signal corresponding to a temperature of the liquid crystal layer, a plurality of pixel electrodes provided for each of a plurality of pixels and applying a voltage to the liquid crystal layer, and a driving device providing a voltage to the plurality of pixel electrodes. The driving device has a nonvolatile storage element storing in advance a coefficient α included in a function expressing a correlation between a temperature change amount in the liquid crystal layer and a variation in phase modulation amount in the liquid crystal layer, and performs a calculation for correcting a level of voltage by use of a temperature indicated by the temperature signal and the coefficient α.

10 Claims, 21 Drawing Sheets

(56) References Cited

U.S. PATENT DOCUMENTS

| | | | |
|---|---|---|---|
| 6,496,170 B1* | 12/2002 | Yoshida et al. | 345/87 |
| 2003/0201966 A1* | 10/2003 | Pan et al. | 345/101 |
| 2007/0182695 A1* | 8/2007 | Shimizu | G09G 3/3648 345/101 |
| 2010/0295836 A1* | 11/2010 | Matsumoto et al. | 345/211 |

FOREIGN PATENT DOCUMENTS

| | | |
|---|---|---|
| CN | 101889238 | 11/2010 |
| JP | H08-152602 A | 6/1996 |
| JP | 2000-010058 | 1/2000 |
| JP | 2001-343629 A | 12/2001 |
| JP | 2004-133159 A | 4/2004 |
| JP | 2006-184305 A | 7/2006 |
| JP | 3859317 B2 | 12/2006 |
| JP | 2007-233061 A | 9/2007 |
| WO | WO-2009/072563 A1 | 6/2009 |

OTHER PUBLICATIONS

U.S. Office Action dated Mar. 19, 2015 that issued in U.S. Appl. No. 13/985,214 including Double Patenting Rejections on pp. 2-3.

* cited by examiner (a)

| CURRENT GRADATION \ TARGET GRADATION | 0 | 32 | 64 | 96 | 128 | 160 | 192 | 224 | 255 |
|---|---|---|---|---|---|---|---|---|---|
| 0 | 0 | 32 | 64 | 96 | 128 | 160 | 192 | 224 | 255 |
| 32 | 0 | 32 | 156 | 206 | 228 | 242 | 248 | 255 | 255 |
| 64 | 0 | 0 | 32 | 142 | 192 | 208 | 232 | 240 | 255 |
| 96 | 0 | 0 | 0 | 64 | 123 | 160 | 186 | 224 | 255 |
| 128 | 0 | 0 | 0 | 32 | 96 | 145 | 177 | 216 | 255 |
| 160 | 0 | 0 | 0 | 20 | 56 | 128 | 173 | 215 | 255 |
| 192 | 0 | 0 | 0 | 0 | 44 | 80 | 160 | 208 | 255 |
| 224 | 0 | 0 | 0 | 0 | 36 | 76 | 128 | 192 | 239 |
| 255 | 0 | 0 | 0 | 0 | 24 | 64 | 108 | 160 | 235 |
| | 0 | 0 | 0 | 0 | 0 | 16 | 60 | 126 | 192 |

SPATIAL LIGHT MODULATOR, AND SPATIAL LIGHT MODULATING METHOD

TECHNICAL FIELD

The present invention relates to a technique of correcting a variation in phase modulation amount according to a temperature change in a liquid crystal layer in a phase-modulation type spatial light modulation device and spatial light modulation method.

BACKGROUND ART

In Patent Document 1, there is described a technique of a temperature compensating device of a color liquid crystal display elements. An object of this technique is to make it possible to appropriately modify optimal output voltage data for temperature according to a variation or a temporal change for each of a plurality of color liquid crystal display elements. FIG. 18 is a block diagram showing a configuration of this device. As shown in FIG. 18, this device includes a temperature sensing circuit 211, a data table 212 in which digital optimal output voltage data for temperature are stored, and from which optimal output voltage data corresponding to temperature data from the temperature sensing circuit 211 are read out, voltage correction means 217 for correcting the optimal output voltage data read out from the data table 212, a D/A conversion circuit 213 which converts the optimal output voltage data from digital to analog, to transmit the data to a drive circuit of the liquid crystal display element, an operating unit 216 that provides correction data to the voltage correction means 217, and control means 214 for modifying the optimal output voltage data for temperature in the data table 212 based on correction data from the operating unit 216 and temperature data from the temperature sensing circuit 211.

Further, in Patent Document 2, there is described a technique of a liquid crystal panel driving device which drives a liquid crystal panel at a high speed by overdrive. FIG. 19 is a block diagram showing a configuration of this liquid crystal panel driving device. This liquid crystal panel driving device is a device which performs overdrive by use of a frame memory 231 and a lookup table 232, and includes plural types of lookup tables 232 corresponding to different temperature ranges. This device activates a selection circuit 233 so as to switch among the lookup tables 232 to use those based on temperature information of an LCD module 234 obtained from a temperature sensor 235.

Further, in Patent Document 3, there is described a technique of a semi-transmissive liquid crystal display device. FIG. 20 is a block diagram showing a configuration of this liquid crystal display device. This liquid crystal display device includes a correction circuit 241. The correction circuit 241 has a lookup table selection unit 242, a plurality of lookup tables for transmissive mode 243, a plurality of lookup tables for reflective mode 253, a frame memory 244, a mode determination unit 245, a switch 246, and a switch control unit 256. The lookup tables for transmissive mode 243 and the lookup tables for reflective mode 253 store correction values (correction gradations) in which temporal changes in signal are emphasized so as to correspond to combinations of current gradations and target gradations. In addition, FIG. 21 is a table showing a configuration example of this lookup table for reflective mode 253.

The switch control unit 256 stores a threshold value Y for an ambient temperature, and outputs a low-level switch control signal SC when a mode selection signal MD output from the mode determination unit 245 is at a low level or an ambient temperature T0 output via an A/D converter 247 from the temperature sensor 248 is lower than or equal to the threshold value Y, and outputs a high-level switch control signal SC in the other case. A correction gradation output from the lookup table for transmissive mode 243 or the lookup table for reflective mode 253 which is selected by the lookup table selection unit 242, an input video signal V1, and the switch control signal SC are input to the switch 246. The switch 246 outputs the correction gradation when the switch control signal SC is at a low level, and outputs the input video signal V1 when the switch control signal SC is at a high level, as a correction video signal V2.

CITATION LIST

Patent Literature

Patent Document 1: Japanese Patent Publication No. 3859317
Patent Document 2: Japanese Patent Application Laid-Open No. 2004-133159
Patent Document 3: Japanese Patent Application Laid-Open No. 2007-233061

SUMMARY OF INVENTION

Technical Problem

Conventionally, a technique for modulating a phase of light by a spatial light modulator (SLM) has been known. In general, a spatial light modulator includes a liquid crystal layer, and electrodes which are provided for each of a plurality of pixels along the liquid crystal layer. When a voltage is applied to the electrode, a liquid crystal molecule rotates according to a level of the voltage, to change the birefringence index of the liquid crystal. When light is made incident into this liquid crystal layer, a phase of the light changes within the liquid crystal layer, and light having a phase difference with respect to the incident light is emitted to the outside. Here, phase modulation characteristics of the spatial light modulator express the relationship between a level of the applied voltage and a phase difference (i.e., a phase modulation amount) of the emitted light before and after the voltage application. In the phase modulation characteristics, the relationship between a phase modulation amount and an applied voltage is nonlinear. In addition, in order to easily convert such a nonlinear relationship, in general, a lookup table (Look Up Table; LUT) showing a plurality of numerical values to which phase modulation amounts and applied voltages correspond is used.

However, there is a problem that the relationship between a phase modulation amount and an applied voltage varies when a temperature of the liquid crystal layer changes. That is, even in the case where a given constant voltage is applied, a phase modulation amount differs according to a temperature of the liquid crystal layer at that time. Such a phenomenon causes serious problems depending on an intended application for which the spatial light modulator is used. For example, in the case where an object to be processed is irradiated via the spatial light modulator with laser beam output from a laser beam source in laser processing, an error in a phase modulation amount exerts a great effect on processing accuracy. Further, in the case where the spatial light modulator is used for a microscope, an ophthalmoscope, or the like, there is a possibility that a useful observed image may not be obtained depending on its operating temperature.

In addition, an object of the temperature compensating device described in Patent Document 1 described above is to correct a color change according to a temperature change in the liquid crystal display element. This temperature compensating device retains an LUT showing the relationship between a temperature of the liquid crystal display element and an applied voltage value in advance, and selects an applied voltage value corresponding to a detected temperature from the LUT. Further, the devices described in Patent Documents 2 and 3 include a plurality of LUTs showing the relationship between a temperature and an applied voltage value, and select an optimal LUT according to a level of temperature change. In this way, the devices described in Patent Documents 1 to 3 all include the LUTs showing the relationship between a temperature and an applied voltage value. However, the relationship between a phase modulation amount and an applied voltage is nonlinear as described above, and if these relationships are shown by LUTs, it is necessary to retain a plurality of LUTs corresponding to a plurality of temperatures as Patent Documents 2 and 3, and a large storage capacity is required. Further, it takes a great deal of time and effort to create such LUTs, and the accuracy of an applied voltage value with respect to a desired phase modulation amount as well is suppressed.

The present invention has been made in view of the above problem, and an object thereof is to provide a spatial light modulation device and a spatial light modulation method in which it is possible to decrease a necessary storage capacity, which makes its production easy, and it is possible to improve the accuracy of an applied voltage value with respect to a desired phase modulation amount.

Solution to Problem

In order to solve the above-described problem, a spatial light modulation device according to the present invention is a spatial light modulation device which modulates a phase of incident light for each of the plurality of pixels one-dimensionally or two-dimensionally arrayed, and the device includes (1) a liquid crystal layer modulating a phase of the incident light according to a level of an applied electric field, (2) a temperature sensor generating a temperature signal which is a signal corresponding to a temperature of the liquid crystal layer, (3) a plurality of pixel electrodes which are provided for each of the plurality of pixels and apply a voltage for generating the applied electric field to the liquid crystal layer, and (4) a voltage generation unit providing the voltage to the plurality of pixel electrodes. The voltage generation unit has storage means. In this storage means, one or a plurality of first coefficients included in a first function expressing a correlation between a temperature change amount with respect to a reference temperature in the liquid crystal layer and a variation in phase modulation amount in the liquid crystal layer, and a plurality of second coefficients included in a second function which is a nonlinear function expressing a correlation between an applied voltage and a phase modulation amount are stored in advance. The voltage generation unit carries out a calculation for correcting a phase modulation amount indicated value which is a target value of a phase modulation amount by use of a temperature indicated by the temperature signal provided from the temperature sensor, and the one or plurality of first coefficients, thereafter converts the phase modulation amount indicated value into an applied voltage corresponding value by use of the plurality of second coefficients, and provides the voltage corresponding to the applied voltage corresponding value to the plurality of pixel electrodes.

In this spatial light modulation device, the storage means of the voltage generation unit stores the one or plurality of first coefficients included in the first function expressing the correlation between a temperature change amount of the liquid crystal layer and a variation in phase modulation amount in the liquid crystal layer. As shown in the embodiment which will be described later, the inventors have found that such a first function is determined in advance, and the coefficients thereof (first coefficients) are stored, thereby it is possible to preferably correct a variation in phase modulation amount by the temperature change without using a large number of LUTs. That is, in this spatial light modulation device, the voltage generation unit carries out a calculation for correcting the phase modulation amount indicated value by use of a temperature indicated by the temperature signal provided from the temperature sensor and the one or plurality of first coefficients. Thereby, it is possible to provide a spatial light modulation device in which it is possible to decrease a necessary storage capacity, which makes its production easy. Moreover, different from the case where an LUT which is a discrete data aggregate is used, it is possible to continuously obtain an applied voltage value corresponding to a desired phase modulation amount, so as to correspond to a temperature change in the liquid crystal layer, and accordingly, it is possible to improve the accuracy of an applied voltage value with respect to a desired phase modulation amount.

Further, in this spatial light modulation device, the storage means of the voltage generation unit stores the plurality of second coefficients included in the second function which is a nonlinear function expressing a correlation between an applied voltage and a phase modulation amount. Because the relationship between an applied voltage and a phase modulation amount is nonlinear, conventionally, LUTs have been widely used in order to convert a phase modulation amount indicated value into an applied voltage. However, in an LUT, for example, in the case where integer values of input values such as 0, 1, . . . , 255 are made to correspond to the phase modulation amounts 0 to $2\pi$ (rad) when the liquid crystal layer is at a high temperature, input values corresponding to the phase modulation amounts 0 to $2\pi$ (rad) are decreased (for example, 0, 1, . . . , 200) when the liquid crystal layer is at a low temperature. In this way, in the case where LUTs are used, the problem that a phase modulation amount allocated to the minimum unit of an input value differs depending on a temperature occurs. Meanwhile, as shown in the embodiment which will be described later, the second function of an applied voltage and a phase modulation amount in a nonlinear relationship is determined in advance, and the coefficients thereof (second coefficients) are used along with the above-described first coefficients, thereby it is possible to always keep the relationship between an input value and a phase modulation amount constant regardless of the temperature of the liquid crystal layer.

Further, the spatial light modulation device may have a configuration in which the first function is a linear function, and the number of the first coefficients is one. In this case, it is preferable that the range of the voltage be limited to a predetermined range in which it is possible to approximate the first function as a linear function. Further, in this case, it is preferable that the voltage generation unit correct the phase modulation amount indicated value based on the following formula:

[Formula 1]

$$\phi_0 = \frac{\phi_T}{(100 - \alpha \times (T - T0))} \times 100$$

(where, T is a temperature indicated by the temperature signal provided from the temperature sensor, T0 is a reference temperature, $\phi_T$ is the phase modulation amount indicated value before correction, $\phi_0$ is the phase modulation amount indicated value after correction, and α, is the first coefficient).

Further, the spatial light modulation device may have a configuration in which the first function is an n-th order function (n is an integer not less than 2), and the number of the first coefficients is n. In this case, it is preferable that the voltage generation unit correct the phase modulation amount indicated value based on the following formula:

[Formula 2]

$$\phi_0 = \frac{\phi_T}{100 - (T - T0) \times \beta_1 - \ldots - (T - T0)^n \times \beta_n} \times 100$$

(where, T is a temperature indicated by the temperature signal provided from the temperature sensor, T0 is a reference temperature, $\phi_T$ is the phase modulation amount indicated value before correction, $\phi_0$ is the phase modulation amount indicated value after correction, and $\beta_1 \ldots \beta_n$ are the n first coefficients).

Further, a spatial light modulation method according to the present invention is a spatial light modulation method which uses a liquid crystal layer modulating a phase of incident light according to a level of an applied electric field, and a plurality of pixel electrodes which are provided for each of a plurality of pixels one-dimensionally or two-dimensionally arrayed, and apply a voltage for generating the applied electric field to the liquid crystal layer, and the method includes (1) a temperature acquisition step of acquiring a temperature signal which is a signal corresponding to a temperature of the liquid crystal layer from a temperature sensor, (2) a correction calculation step of reading out one or a plurality of first coefficients from storage means storing in advance the one or plurality of first coefficients included in a first function expressing a correlation between a temperature change amount with respect to a reference temperature in the liquid crystal layer and a variation in phase modulation amount in the liquid crystal layer, and a plurality of second coefficients included in a second function which is a nonlinear function expressing a correlation between an applied voltage and a phase modulation amount, and carrying out a calculation for correcting a phase modulation amount indicated value which is a target value of a phase modulation amount by use of a temperature indicated by the temperature signal, and the one or plurality of first coefficients, (3) a voltage conversion step of reading out the plurality of second coefficients from the storage means, and converting the phase modulation amount indicated value into an applied voltage corresponding value by use of the plurality of second coefficients, and (4) a voltage application step of providing the voltage corresponding to the applied voltage corresponding value to the plurality of pixel electrodes.

In this spatial light modulation method, the storage means stores the one or plurality of first coefficients included in the first function expressing the correlation between a temperature change amount in the liquid crystal layer and a variation in phase modulation amount in the liquid crystal layer. As shown in the embodiment which will be described later, the inventors have found that such a first function is determined in advance, and the coefficients thereof (first coefficients) are stored, thereby it is possible to preferably correct a variation in phase modulation amount by the temperature change without using a large number of LUTs. That is, in this spatial light modulation method, in the correction calculation step, a calculation for correcting the phase modulation amount indicated value is carried out by use of a temperature indicated by the temperature signal provided from the temperature sensor and the one or plurality of first coefficients. Thereby, it is possible to provide a spatial light modulation method in which it is possible to decrease a necessary storage capacity, which makes production of the device used in the method easy. Moreover, different from the case where an LUT which is a discrete data aggregate is used, it is possible to continuously obtain an applied voltage value corresponding to a desired phase modulation amount, so as to correspond to a temperature change in the liquid crystal layer, and accordingly, it is possible to improve the accuracy of an applied voltage value with respect to a desired phase modulation amount.

Further, in this spatial light modulation method, the storage means stores the plurality of second coefficients included in the second function which is a nonlinear function expressing a correlation between an applied voltage and a phase modulation amount. Because the relationship between an applied voltage and a phase modulation amount is nonlinear, conventionally, LUTs have been widely used in order to convert a phase modulation amount indicated value into an applied voltage. However, in an LUT, for example, in the case where integer values of input values such as 0, 1, ..., 255 are made to correspond to the phase modulation amounts 0 to 2π (rad) when the liquid crystal layer is at a high temperature, input values corresponding to the phase modulation amounts 0 to 2π (rad) are decreased (for example, 0, 1, ..., 200) when the liquid crystal layer is at a low temperature. In this way, in the case where LUTs are used, the problem that a phase modulation amount allocated to the minimum unit of an input value differs depending on a temperature occurs. Meanwhile, as shown in the embodiment which will be described later, the second function of an applied voltage and a phase modulation amount in a nonlinear relationship is determined in advance, and the coefficients thereof (second coefficients) are used along with the above-described first coefficients, thereby it is possible to always keep the relationship between an input value and a phase modulation amount constant regardless of the temperature of the liquid crystal layer.

Further, the spatial light modulation method may have a configuration in which the first function is a linear function, and the number of the first coefficients is one. In this case, it is preferable that the range of the voltage be limited to a predetermined range in which it is possible to approximate the first function as a linear function. Further, in this case, it is preferable that, in the correction calculation step, the phase modulation amount indicated value be corrected based on the following formula:

[Formula 3]

$$\phi_0 = \frac{\phi_T}{(100 - \alpha \times (T - T0))} \times 100$$

(where, T is a temperature indicated by the temperature signal provided from the temperature sensor, T0 is a reference temperature, $\phi_T$ is the phase modulation amount indicated value before correction, $\phi_0$ is the phase modulation amount indicated value after correction, and α is the first coefficient).

Further, the spatial light modulation method may have a configuration in which the first function is an n-th order function (n is an integer not less than 2), and the number of the first coefficients is n. In this case, it is preferable that, in the correction calculation step, the phase modulation amount indicated value be corrected based on the following formula:

[Formula 4]

$$\phi_0 = \frac{\phi_T}{100 - (T-T0) \times \beta_1 - \ldots - (T-T0)^n \times \beta_n} \times 100$$

(where, T is a temperature indicated by the temperature signal provided from the temperature sensor, T0 is a reference temperature, $\phi_T$ is the phase modulation amount indicated value before correction, $\phi_0$ is the phase modulation amount indicated value after correction, and $\beta_1 \ldots \beta_n$ are the n first coefficients).

Advantageous Effects of Invention

In accordance with the present invention, it is possible to provide a spatial light modulation device and a spatial light modulation method in which it is possible to decrease a necessary storage capacity, which makes its production easy, and it is possible to improve the accuracy of an applied voltage value with respect to a desired phase modulation amount.

BRIEF DESCRIPTION OF DRAWINGS

FIG. 21 is a table showing a configuration example of a lookup table for reflective mode of the liquid crystal display device described in Patent Document 3.

DESCRIPTION OF EMBODIMENTS

Hereinafter, embodiments of a spatial light modulation device and a spatial light modulation method according to the present invention will be described in detail with reference to the accompanying drawings. In addition, the same components are denoted by the same reference symbols in the description of the drawings, and overlapping descriptions thereof will be omitted.

Figure 1:
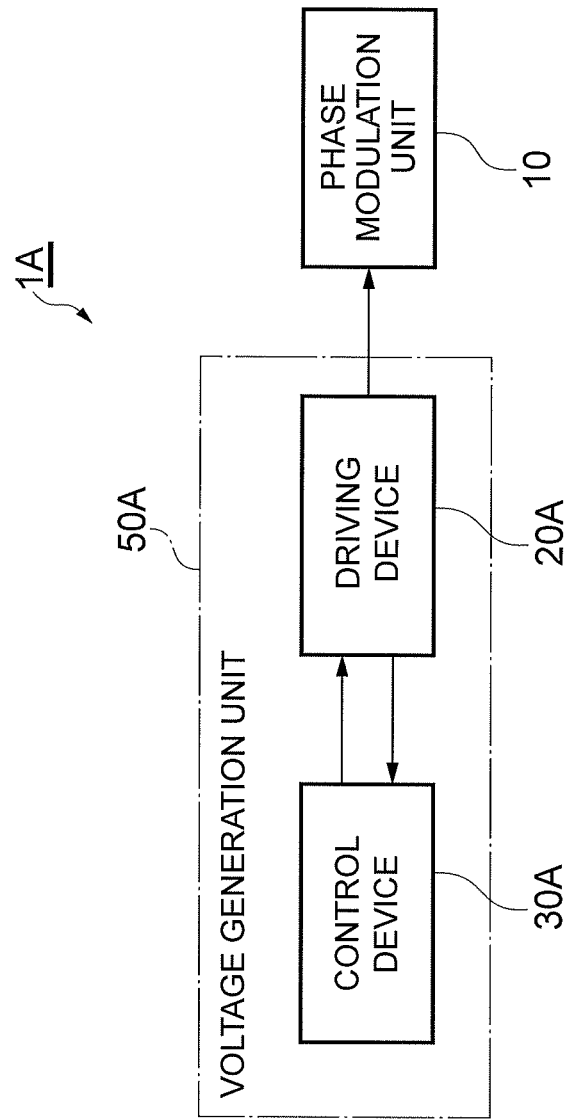
FIG. 1 is a block diagram schematically showing a configuration of a spatial light modulation device according to an embodiment.

FIG. 1 is a block diagram schematically showing a configuration of a spatial light modulation device 1A according to an embodiment of the present invention. As shown in FIG. 1, the spatial light modulation device 1A of the present embodiment includes a phase modulation unit 10. The phase modulation unit 10 is a reflective-type liquid crystal display panel (a so-called LCOS-SLM) having a configuration in which a liquid crystal is formed on a silicon substrate. This phase modulation unit 10 modulates a phase of incident light. Further, the spatial light modulation device 1A includes a voltage generation unit 50A. The voltage generation unit 50A includes a driving device 20A and a control device 30A. The phase modulation unit 10, the driving device 20A, and the control device 30A are respectively disposed in the housings independent of each other.

Figure 2:
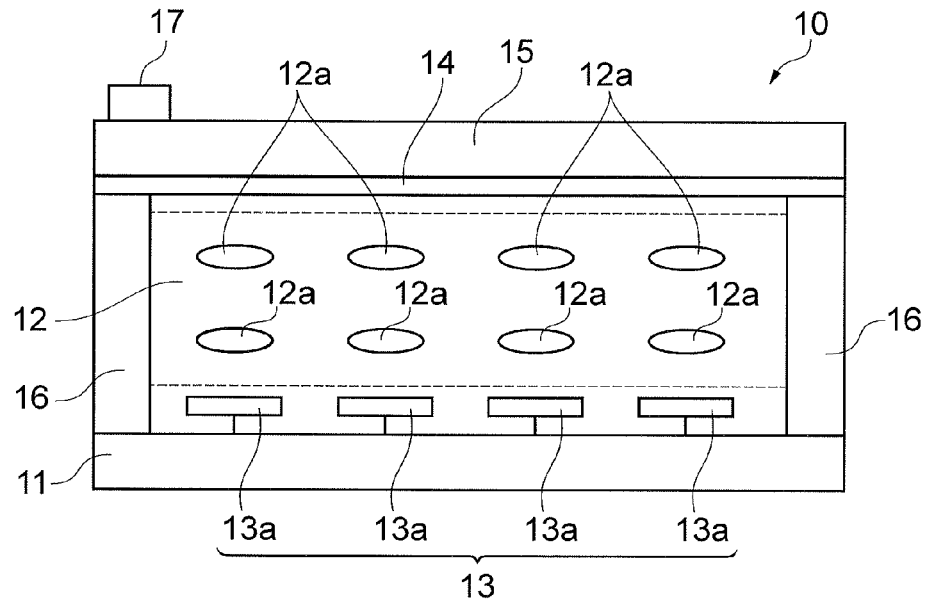
FIG. 2 includes (a) a diagram showing a part of the configuration of a phase modulation unit, and (b) a diagram showing a situation in which liquid crystal molecules on respective pixel electrodes rotate.
Figure 2:
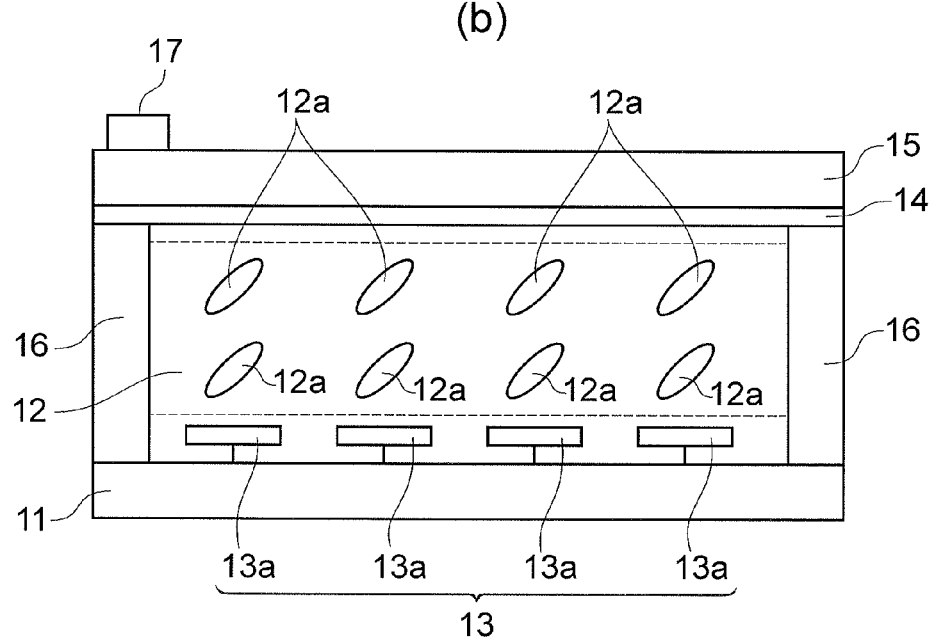

(a) in FIG. 2 is a side sectional view showing a part of the configuration of the phase modulation unit 10. The phase modulation unit 10 has a silicon substrate 11 and a liquid crystal layer 12 provided on the silicon substrate 11. Further, the phase modulation unit 10 further has a first electrode 13 disposed between the silicon substrate 11 and the liquid crystal layer 12, and a second electrode 14 provided at a position so as to sandwich the liquid crystal layer 12 with the first electrode 13. The first electrode 13 has a plurality of pixel electrodes 13a for applying voltage to the liquid crystal layer 12. The plurality of pixel electrodes 13a are two-dimensionally arrayed in a plurality of rows and a plurality of columns, and a plurality of pixels of the phase modulation unit 10 are defined by these pixel electrodes 13a. The second electrode 14 is made of a metal film evaporated on one surface of a glass substrate 15. The glass substrate 15 is supported on the silicon substrate 11 via a spacer 16 such that the above-described one surface and the silicon substrate 11 face each other. The liquid crystal layer 12 is formed by filling the space between the silicon substrate 11 and the glass substrate 15 with liquid crystals.

In the phase modulation unit 10 having such a configuration, an analog signal voltage output from the driving device 20A is applied between the respective pixel electrodes 13a and the second electrode 14. Thereby, an electric field is generated in the liquid crystal layer 12. Then, as shown in (b) in FIG. 2, liquid crystal molecules 12a on the respective pixel electrodes 13a rotate according to the level of the applied electric field. Because the liquid crystal molecules 12a have birefringence characteristics, when light passes through the glass substrate 15, to be made incident, a phase difference corresponding to the rotation of the liquid crystal molecules 12a is provided only for light components parallel to the orientation direction of the liquid crystal molecules 12a in this light. In this way, a phase of light is modulated at each pixel electrode 13a.

Further, as will be described later, the relationship between the birefringence index which the liquid crystal molecules 12a have and the applied voltage to the pixel electrodes 13a varies according to a temperature change in the liquid crystal layer 12. The phase modulation unit 10 of the present embodiment further has a temperature sensor 17 in order to correct such a variation caused by a temperature change. The temperature sensor 17 is provided in order to detect a temperature of the phase modulation unit 10, in particular, a temperature of the liquid crystal layer 12, and generates a temperature signal Stemp which is a signal corresponding to the temperature of the liquid crystal layer 12. The temperature sensor 17 is disposed, for example, on the silicon substrate 11 or on the glass substrate 15.

Figure 3:
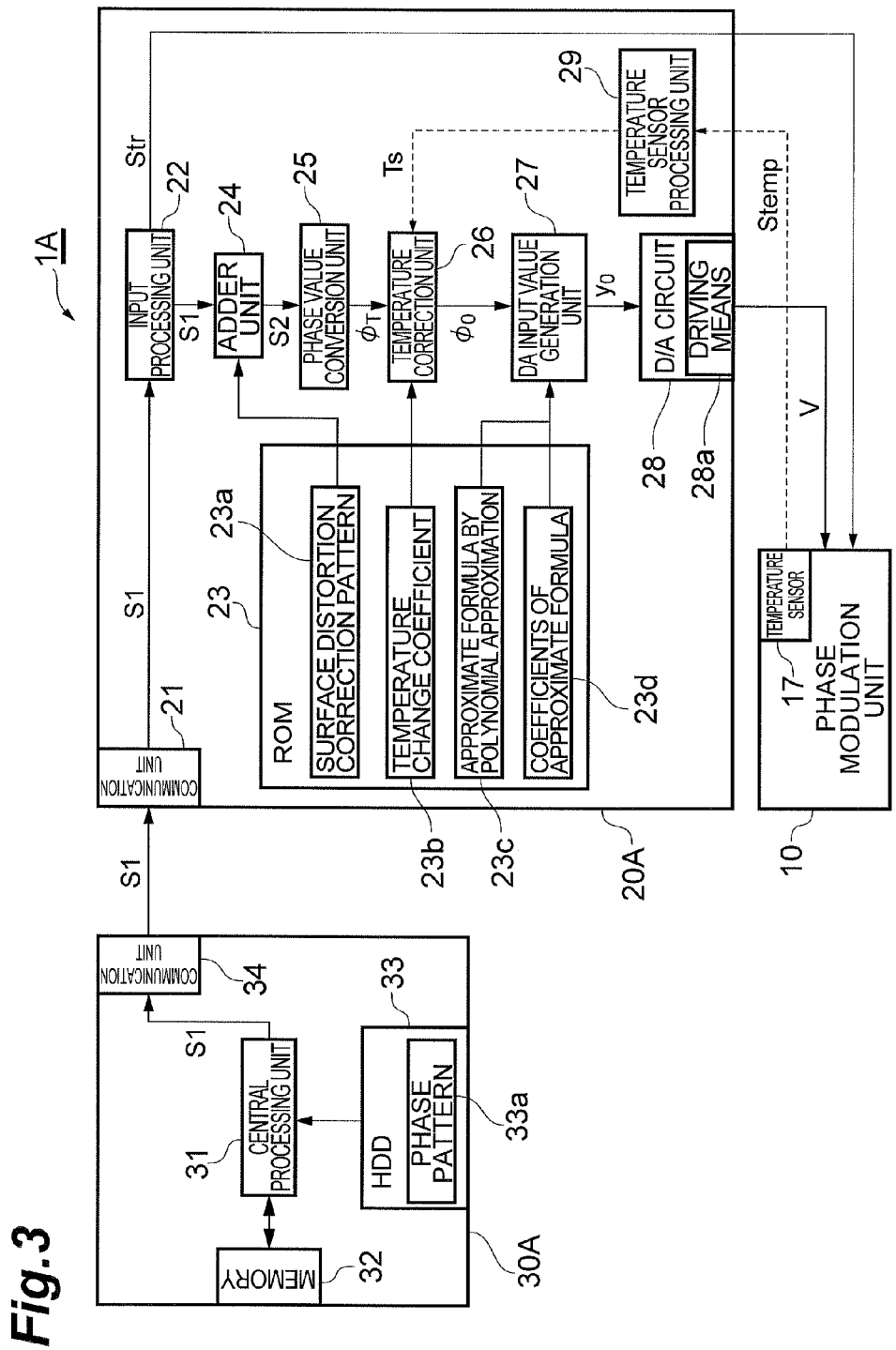
FIG. 3 is a block diagram showing the configurations of a driving device and a control device of a voltage generation unit.

The voltage generation unit 50A provides an analog voltage to the plurality of pixel electrodes 13a. FIG. 3 is a block diagram showing the configurations of the driving device 20A and the control device 30A of the voltage generation unit 50A. As shown in FIG. 3, the control device 30A is preferably realized by, for example, an electronic computer or the like having a central processing unit (CPU) 31, a memory 32, and a hard disk 33. The hard disk 33 stores a desired phase pattern 33a. The phase pattern 33a is data for performing phase modulation at a desired phase modulation amount for each pixel of the phase modulation unit 10. The central processing unit 31 and the memory 32 transform the phase pattern 33a into a control input value (gradation value) S1 for controlling a voltage value to be applied to the liquid crystal layer 12 of the phase modulation unit 10. In addition, in the phase modulation unit 10, a phase modulation amount φ has nonlinearity with respect to an applied voltage value V. Then, in the present embodiment, the control input value S1 whose relationship with the phase modulation amount φ is able to be handled as linear is conveniently defined. For example, it is preferable that the control input value S1 be set as integers from 0 to 255, and these integers be made to correspond to the phase modulation amount φ (for example, 0 to 2π (rad)).

The control device 30A further has a communication unit 34 which carries out transmission/reception of a signal with the driving device 20A, and the control input value S1 is transmitted to a communication unit 21 of the driving device 20A via the communication unit 34. In addition, as communication means between the communication unit 34 and the communication unit 21, various means such as serial communication or parallel communication may be used. Further, the communication means may be any of wired and wireless communication means.

As shown in FIG. 3, the driving device 20A has the communication unit 21, an input processing unit 22, a nonvolatile storage element (Read Only Memory: ROM) 23, an adder unit 24, a phase conversion unit 25, a temperature correction unit 26, a DA input value generation unit 27, a digital-analog converter unit 28, and a temperature sensor processing unit 29.

The communication unit 21 carries out transmission/reception of a signal such as the control input value S1 with the communication unit 34 of the control device 30A. The input processing unit 22 generates a trigger signal Str for generating a vertical synchronizing signal and a horizontal synchronizing signal based on the signal received from the communication unit 21. The nonvolatile storage element 23 is storage means for storing surface distortion correction pattern data 23a, temperature change coefficient data 23b, polynomial approximate formula data 23c, and coefficient data 23d thereof. The surface distortion correction pattern data 23a is data for correcting surface distortion generated on the surface of the first electrode 13 at the time of making up circuit elements around the pixel electrodes 13a on the silicon substrate 11 by a phase difference provided by the liquid crystal layer 12. The temperature change coefficient data 23b is data on coefficients for correcting a variation in the relationship between an applied voltage to the pixel electrodes 13a and a phase modulation amount by a temperature change in the liquid crystal layer 12. The polynomial approximate formula data 23c and the coefficient data 23d thereof are data for correcting the nonlinearity of the liquid crystal layer 12, i.e., the nonlinearity between a level of voltage to be applied to each pixel electrode 13a and a phase modulation amount. In addition, the polynomial approximate formula data 23c and the coefficient data 23d thereof are data when a temperature of the liquid crystal layer 12 is a reference temperature.

The adder unit 24 reads out the surface distortion correction pattern data 23a from the nonvolatile storage element 23, and adds the surface distortion correction pattern data 23a to the control input value S1 provided from the control device 30A, thereby generating a surface-distortion-corrected control input value S2. The adder unit 24 outputs the generated control input value S2 to the phase conversion unit 25. The phase conversion unit 25 converts the control input value S2 into a control phase value $\phi_T$ which is a target value of a phase modulation amount (a phase modulation amount indicated value). In detail, a control phase value $\phi_T$ is calculated by use of the following formula (1). In addition, this control phase value $\phi_T$ is a value corresponding to a current temperature T of the liquid crystal layer 12.

[Formula 5]

$$\phi_T = S2 \times 2\pi/255 \quad S2 = 0, \ldots, 255 \tag{1}$$

The phase conversion unit 25 outputs the control phase value $\phi_T$ generated in this way to the temperature correction unit 26.

The temperature correction unit 26 corrects a variation in modulation characteristics by a temperature change in the liquid crystal layer 12 for the control phase value $\phi_T$. The temperature correction unit 26 reads out the temperature change coefficient data 23b from the nonvolatile storage element 23. Then, the temperature correction unit 26 performs predetermined arithmetic processing on the control phase value $\phi_T$ based on the temperature change coefficient data 23b and a temperature value Ts obtained from the temperature sensor processing unit 29, thereby generating a control phase value $\phi_0$ serving as a converted phase modulation amount indicated value when a temperature of the liquid crystal layer 12 is a reference temperature T0. The temperature correction unit 26 outputs the generated control phase value $\phi_0$ to the DA input value generation unit 27.

The DA input value generation unit 27 reads out the polynomial approximate formula data 23c and the coefficient data 23d thereof from the nonvolatile storage element 23. Then, the DA input value generation unit 27 performs predetermined arithmetic processing on the control phase value $\phi_0$ output from the temperature correction unit 26 by use of the polynomial approximate formula data 23c and the coefficient data 23d thereof, thereby generating a DA input value $y_0$ (an applied voltage corresponding value). This DA input value $y_0$ is a value, in which the control phase value $\phi_0$ is converted into a preferable value for obtaining a targeted phase value at the current temperature T of the liquid crystal layer 12, and also a preferable value to be input to the digital-analog converter unit 28. The DA input value generation unit 27 outputs the generated DA input value $y_0$ to the digital-analog converter unit 28. The digital-analog converter unit 28 generates an analog voltage V for each pixel which is applied to the respective pixels of the phase modulation unit 10 based on the DA input value $y_0$. These analog voltages V are output to the phase modulation unit 10 through a driving means 28a, to be applied to the respective pixel electrodes 13a (refer to FIG. 2). In the phase modulation unit 10, the inclination of the liquid crystal molecules 12a (refer to FIG. 2) changes according to a level of the applied voltage V, to cause a change in refractive index. As a result, the phase distribution corresponding to the desired phase pattern 33a is spatially expressed, thereby modulating the phase of the incident light.

The temperature sensor processing unit 29 receives a temperature signal Stemp of a current temperature of the liquid crystal layer 12 from the temperature sensor 17 of the phase modulation unit 10. The temperature sensor processing unit 29 provides a temperature value Ts of the liquid crystal layer 12 read from this temperature signal Stemp, to the temperature correction unit 26.

In addition, all or some of the surface distortion correction pattern data 23a, the temperature change coefficient data 23b, the polynomial approximate formula data 23c and the coefficient data 23d thereof which are stored in the nonvolatile storage element 23 of the driving device 20A may be stored on the hard disk 33 of the control device 30A. In that case, it is preferable that all or some of the functions of the adder unit 24, the phase conversion unit 25, the temperature correction unit 26, and the DA input value generation unit 27 be realized by the central processing unit 31 and the memory 32.

Figure 4:
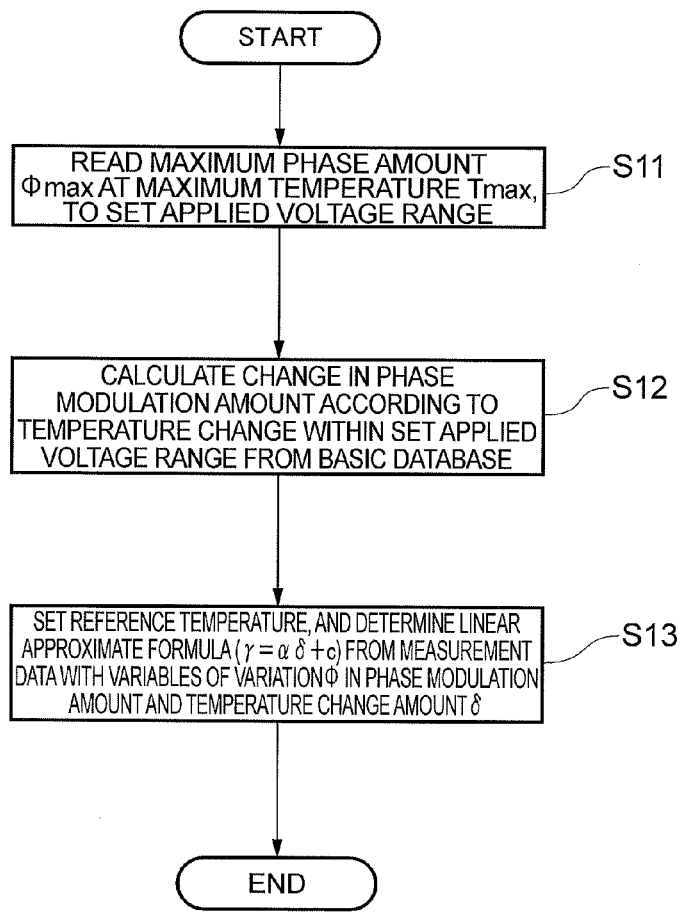
FIG. 4 is a flowchart showing a calculation method of temperature change coefficient data.
Figure 5:
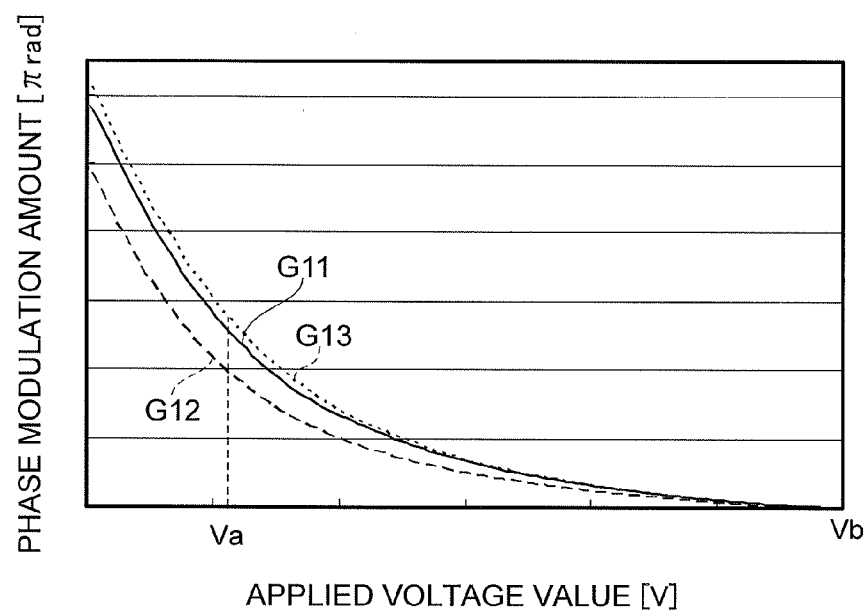
FIG. 5 is a graph showing an example of the relationship between an applied voltage to the pixel electrode and a phase modulation amount.

Here, a calculation method of the temperature change coefficient data 23b will be described. FIG. 4 is a flowchart showing the calculation method. Further, FIG. 5 is a graph showing an example of the relationship between an applied voltage V to the pixel electrode 13a and a phase modulation amount $\phi$. FIG. 5 shows a graph G11 when a temperature of the liquid crystal layer 12 is the reference temperature T0, a graph G12 at a maximum temperature Tmax which is estimated in the usage environment of the spatial light modulation device 1A, and a graph G13 at a minimum temperature Tmin which is estimated in the usage environment of the spatial light modulation device 1A. In addition, it is preferable that a calculation of the temperature change coefficient data 23b be carried out, for example, during the inspection of the spatial light modulation device 1A, etc.

First, a range of applied voltages to the pixel electrodes 13a is set based on the maximum temperature Tmax estimated in the liquid crystal layer 12, and the maximum phase modulation amount $\phi$max required for the phase modulation unit 10 at the maximum temperature Tmax (Step S11). In addition, in the following description, to facilitate understanding, the maximum phase modulation amount $\phi$max is set to $2\pi$ (rad). Further, it is given that a maximum value in the applied voltage range A set in this step S11 is Vb, and a minimum value (that is a voltage value corresponding to the maximum phase modulation amount $\phi$max) is Va (refer to FIG. 5).

Figure 6:
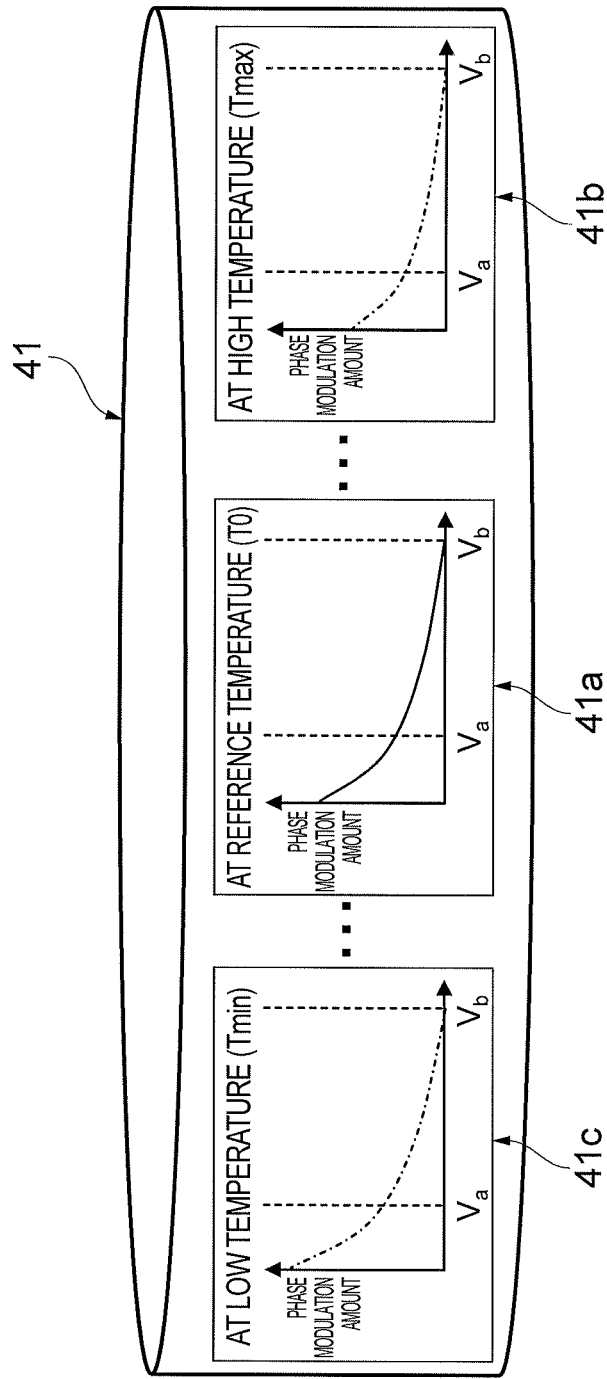
FIG. 6 is a diagram conceptually showing a configuration of a basic database.

Next, based on the database (hereinafter called the basic database) prepared in advance, a variation in phase modulation characteristics according to a temperature change in the liquid crystal layer 12 in the applied voltage range A (Va to Vb) set in the above-described Step S11 is calculated (Step S12). Here, FIG. 6 is a diagram conceptually showing a configuration of the basic database. A basic database 41 includes multiple data prepared at respective temperatures of a discrete temperature value group included in this temperature range (data showing the relationship between the applied voltage V and the phase modulation amount $\phi$) in the temperature range Tmin to Tmax of the liquid crystal layer 12. In addition, as shown in FIG. 6, data at reference 41a showing the relationship between the applied voltage V and the phase modulation amount $\phi$ at the reference temperature T0, data at a high temperature 41b showing the relationship between the applied voltage V and the phase modulation amount $\phi$ when a temperature of the liquid crystal layer 12 is the maximum temperature Tmax, and data at a low temperature 41c showing the relationship between the applied voltage V and the phase modulation amount $\phi$ when a temperature of the liquid crystal layer 12 is the minimum temperature Tmin are included in these multiple data. In the multiple data including these data 41a to 41c which are included in the basic database 41, the relationships between the applied voltages V and the phase modulation amounts $\phi$ are all nonlinear. In this step S12, variations in phase modulation characteristics according to a temperature change in the liquid crystal layer 12 are calculated over the entire range of the applied voltage range A (Va to Vb) by use of such a basic database 41.

Figure 7:
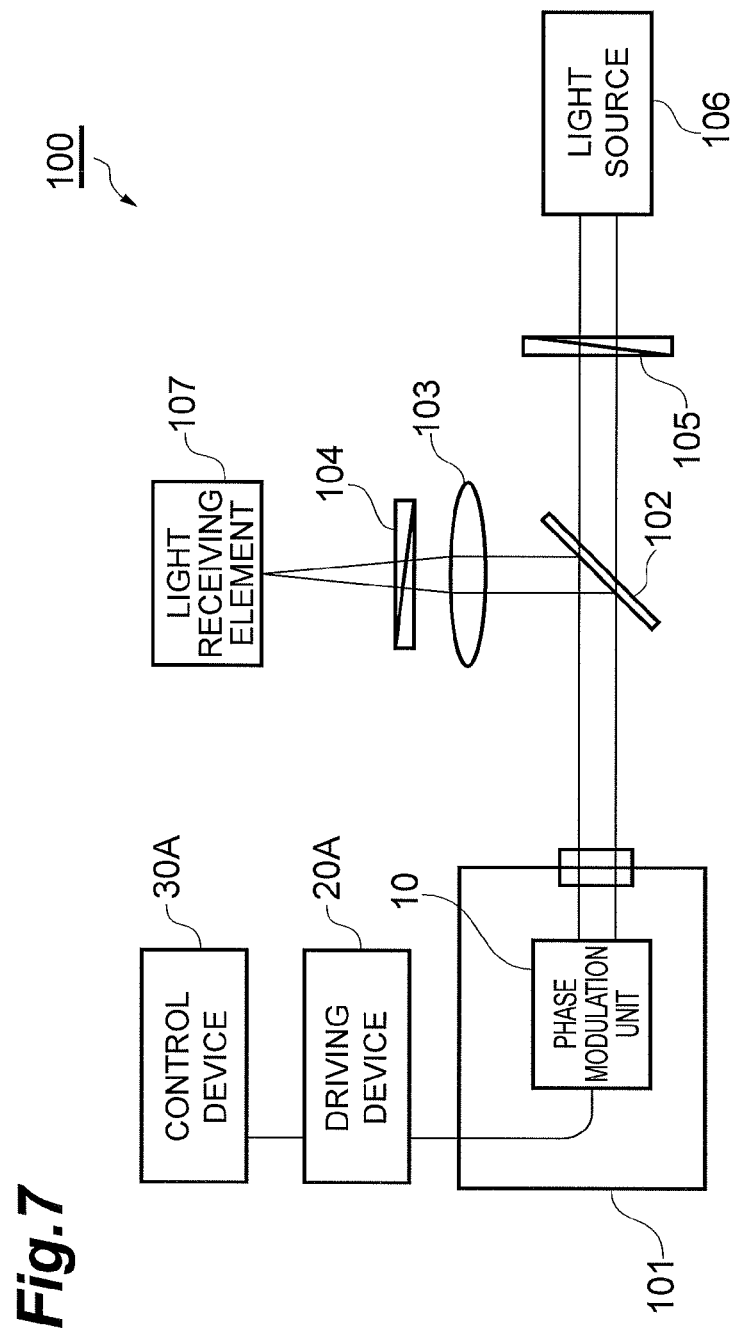
FIG. 7 is a diagram showing a polarization interferometer as an example of an optical system which is used at the time of creating the basic database.

Here, FIG. 7 is a diagram showing a polarization interferometer 100 as an example of an optical system which is used at the time of creating the basic database. This polarization interferometer 100 includes a temperature control device 101, a half mirror 102, a lens 103, an analyzer 104, a polarizer 105, a light source 106, and a light receiving element 107. The temperature control device 101 is a device for controlling a temperature of the liquid crystal layer 12 in the phase modulation unit 10 to be an arbitrary temperature. The light source 106 generates light with a predetermined wavelength. This light with a predetermined wavelength is made incident into the phase modulation unit 10 via the polarizer 105 and the half mirror 102. The light receiving element 107 detects a light intensity of emitted light from the phase modulation unit 10. The emitted light from the phase modulation unit 10 is reflected by the half mirror 102, to thereafter reach the light receiving element 107 via the lens 103 and the analyzer 104. The analyzer 104 is in a relationship of crossed Nicol or open Nicol with respect to the polarizer 105.

At the time of creating the basic database, first, the phase modulation unit 10 is housed in the temperature control device 101, to control the liquid crystal layer 12 of the phase modulation unit 10 to be an arbitrary temperature. Then, after the temperature of the liquid crystal layer 12 becomes stabilized at a predetermined temperature, the voltages are applied to the pixel electrodes 13a while changing an applied voltage within the entire voltage range which is able to be applied to the liquid crystal layer 12, and a phase difference between the incident light and the emitted light generated by the electric field is measured. In detail, linearly-polarized light parallel to the orientation direction of the liquid crystal layer 12 is generated by the polarizer 105, and this light is made incident into the phase modulation unit 10. At this time, phase modulation (phase delay) occurs in the emitted light from the phase modulation unit 10 according to a level of the applied voltage to the pixel electrodes 13a. Then, when this emitted light passes through the analyzer 104, because this analyzer 104 is in a relationship of crossed Nicol (or open Nicol) with respect to the polarizer 105, the light intensity thereof changes according to a phase modulation amount of the emitted light. Accordingly, based on the light intensity detected in the light receiving element 107 and an applied voltage value at that time, it is possible to preferably obtain the relationship between the applied voltage and the phase modulation amount, i.e., the basic database when a temperature of the liquid crystal layer 12 is a predetermined temperature.

Figure 8:
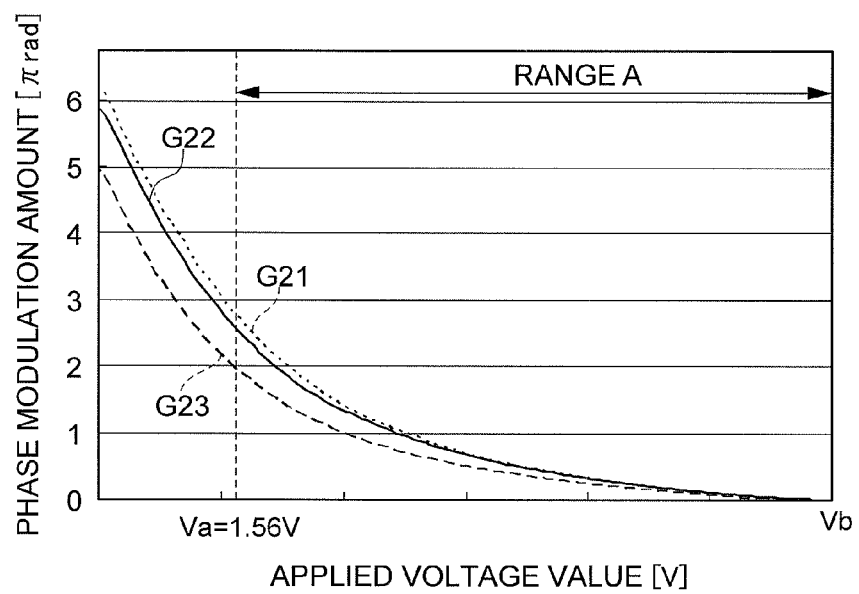
FIG. 8 is a graph showing a specific example of the relationship between an applied voltage and a phase modulation amount.

In addition, FIG. 8 is a graph showing a specific example of the relationship between the applied voltage and the phase modulation amount which can be obtained in this way, a graph G21 shows the case where a temperature of the liquid crystal layer 12 is 20 degrees (the minimum temperature Tmin), a graph G22 shows the case where a temperature of the liquid crystal layer 12 is 27 degrees (the reference temperature T0), and a graph G23 shows the case where a temperature of the liquid crystal layer 12 is 42 degrees (the maximum temperature Tmax), respectively. Further, in these graphs, the minimum voltage Va (i.e., an applied voltage by which a phase modulation amount becomes $2\pi$ (rad)) in the applied voltage range A is 1.56 (V). With reference to FIG. 8, it is understood that $2.56\pi$ (rad) is obtained as a phase modulation amount $\phi$ for the maximum voltage Vb in the case where a temperature of the liquid crystal layer 12 is the reference temperature T0, and $2.79\pi$ (rad) is obtained as a phase modulation amount $\phi$ for the maximum voltage Vb in the case where a temperature is the minimum temperature Tmin.

As described above, in this Step S12, a phase modulation amount $\phi$ is measured at each temperature of the liquid crystal layer 12 over the entire voltage range which can be applied to the liquid crystal layer 12, and the results thereof are summarized in a table for each temperature.

In addition, because the set voltage range A (Va to Vb) differs depending on a wavelength of incident light in the phase modulation unit 10, the phase modulation amount $\phi$ as well differs depending on a wavelength of incident light. However, in the present embodiment, the above-described Step S12 is carried out only once by use of incident light with a reference wavelength, and the following conversion equation is applied to the basic database obtained as a result of Step S12, thereby it is possible to obtain a basic database for another wavelength. That is, given that a reference wavelength is $\lambda_{standard}$, and a phase modulation amount at a display gradation value tv is $\phi_{standard}$(tv), a phase modulation amount $\phi$(tv) at a given wavelength $\lambda$, is determined by the following formula (2).

[Formula 6]

$$\phi(tv) = \phi_{stnadard}(tv) \times \frac{\lambda_{standard}}{\lambda} \qquad (2)$$

In addition, the wavelength dispersive characteristics of the liquid crystal layer 12 may be further taken into consideration in the above formula (2).

Then, the table of the phase modulation amount $\phi$ for each temperature determined by the above-described method is converted into a table of a variation $\gamma$ in phase modulation amount. That is, given that a phase modulation amount obtained when the phase modulation unit 10 is at a temperature T is $\phi_T$, and a phase modulation amount obtained when the phase modulation unit 10 is at the reference temperature T0 is $\phi_0$, it is possible to calculate a variation $\gamma$ in phase modulation amount by the following formula (3).

[Formula 7]

$$\gamma = \frac{\phi_T}{\phi_0} \times 100 \qquad (3)$$

Figure 9:
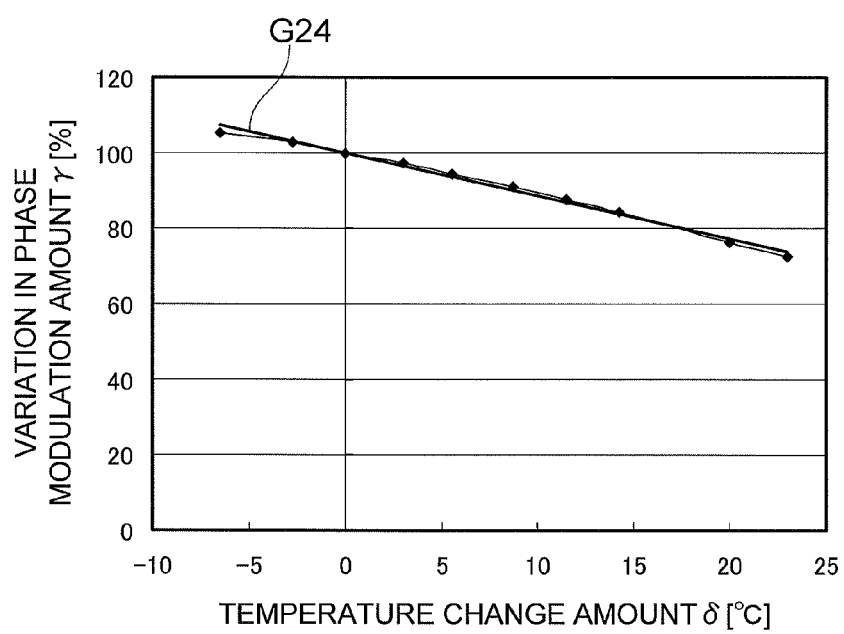
FIG. 9 is a graph showing an example of the relationship between a temperature change amount δ (° C.) of the liquid crystal layer, and a variation in phase modulation amount γ (%).

As shown in FIG. 4, after the variation $\gamma$ in phase modulation amount according to a temperature change in the liquid crystal layer 12 is calculated in the above-described Step S12, a temperature change coefficient $\alpha$ included in the temperature change coefficient data 23b is calculated by use of this calculated variation $\gamma$ (Step S13). Here, FIG. 9 is a graph showing an example of the relationship between a temperature change amount $\delta$(° C.) of the liquid crystal layer 12 and a variation $\gamma$ in phase modulation amount based on the data obtained in Step S12. In addition, a temperature change amount $\delta$ is a difference (T−T0) between the reference temperature T0 and the temperature T.

With reference to FIG. 9, it is understood that a temperature change amount $\delta$ of the liquid crystal layer 12 and a variation $\gamma$ in phase modulation amount are in a substantially proportional relationship, and it is possible to approximate it with a linear function G24. Such approximation is possible in the case where an applied voltage range is limited within the applied voltage range A shown in FIG. 8, i.e., a predetermined range which can be approximated as a linear function. In this Step S13, a constant $\alpha$ of the following approximate formula (4) in this proportional relationship is determined.

[Formula 8]

$$\gamma = \alpha\delta + c \qquad (4)$$

This constant $\alpha$ is the temperature change coefficient $\alpha$ as the temperature change coefficient data 23b. In other words, the temperature change coefficient $\alpha$ expresses a change in phase modulation characteristics according to a temperature change in the liquid crystal layer 12 as a given coefficient.

The temperature correction unit 26 generates a control phase value $\phi_0$ which is a converted phase modulation amount indicated value in the case where a temperature of the liquid crystal layer 12 is the reference temperature T0 by, for example, the following calculation. Now, it is assumed that a given phase modulation amount $\phi_T$ is obtained by applying a voltage V to the pixel electrode 13a in the case where a temperature of the phase modulation unit 10 is a given temperature T. In the case where a temperature of the phase modulation unit 10 is the reference temperature T0, a phase modulation amount (control phase value) $\phi_0$ obtained at the time of applying the voltage V of the same level to the pixel electrode 13a can be determined by the following formula (5) including the aforementioned temperature change coefficient $\alpha$.

[Formula 9]

$$\phi_0 = \frac{\phi_T}{(100 - \alpha \times (T - T0))} \times 100 \qquad (5)$$

Next, a method for deriving the polynomial approximate formula data 23c and the coefficient data 23d thereof will be described. In addition, it is preferable that the derivation of the polynomial approximate formula data 23c and the coefficient data 23d thereof be carried out, for example, during inspection of the spatial light modulation device 1A, etc.

Figure 10:
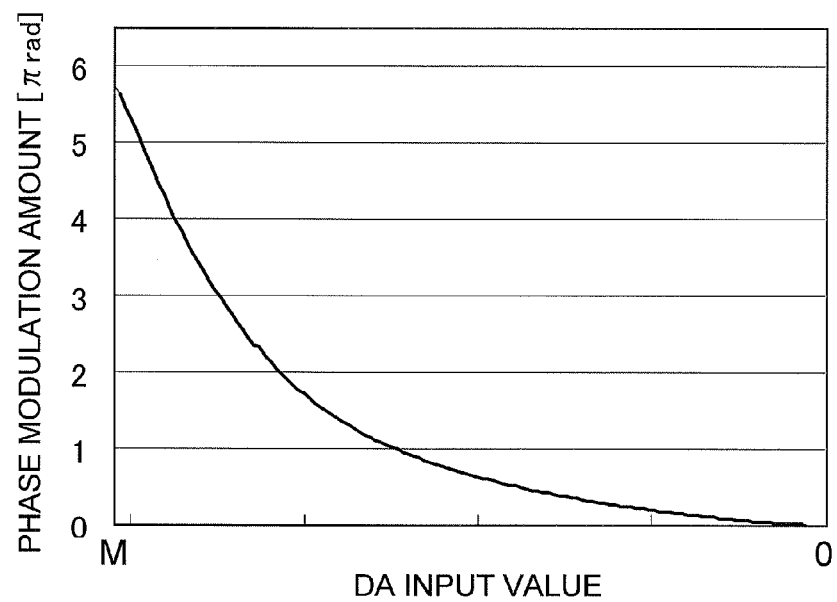
FIG. 10 is a graph on which the relationship between a DA input value and a control phase value is derived from the relationship between an applied voltage and a phase modulation amount.

FIG. 10 is a graph on which the relationship between a DA input value $y_0$ and a control phase value $\phi_0$ is derived from, for example, the relationship between an applied voltage V and a phase modulation amount $\phi_0$ shown in FIG. 8. It is possible to preferably derive this graph by converting the applied voltage V into the DA input value $y_0$ by the formula (6) shown below. Here, in the formula (6), M is a full gradation value and i is an integer from 0 to M−1.

[Formula 10]

$$y_0 = V_b - \frac{i \times (V_b - V_a)}{M-1} \quad (6)$$

In addition, the DA input value $y_0$ calculated in this way is a digital signal of the full gradation value M (i.e., gradation values 0 to M−1). In one example, M=4096.

Figure 11:
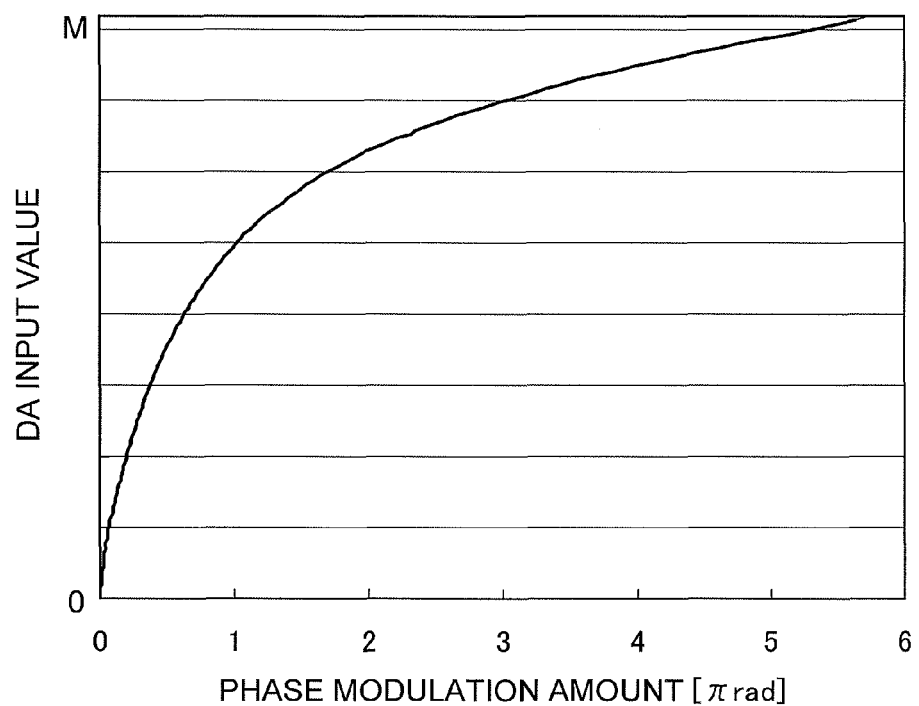
FIG. 11 is a graph on which the relationship between a phase modulation amount and a DA input value shown in FIG. 10 is expressed by plotting the phase modulation amount on the horizontal axis and plotting the DA input value on the vertical axis.

Next, the relationship between a phase modulation amount $\phi_0$ and a DA input value $y_0$ shown in FIG. 10 is, as shown in FIG. 11, expressed by plotting the phase modulation amount $\phi_0$ on the horizontal axis and the DA input value $y_0$ on the vertical axis. It is possible to express the relationship between a phase modulation amount $\phi_0$ and a DA input value $y_0$ on this graph by use of the following polynomial approximate formula (7). In addition, in the formula (7), $x_0$ to $x_m$ are coefficients of the polynomial approximate formula, and m is an order of a polynomial.

[Formula 11]

$$y_0 = x_m\phi_0^m + x_{m-1}\phi_0^{m-1} + \ldots + x_1\phi_0 + x_0 \quad (7)$$

This formula (7) is stored as the polynomial approximate formula data 23c, and the coefficients $x_0$ to $x_m$ are stored as the coefficient data 23d of the polynomial approximate formula in the nonvolatile storage element 23, respectively.

The DA input value generation unit 27 calculates a DA input value $y_0$ from the control phase value $\phi_0$ output from the temperature correction unit 26 based on the polynomial approximate formula (7) and the coefficients $x_0$ to $x_m$ thereof obtained in this way. That is, this DA input value $y_0$ is a value preferable for obtaining a phase modulation amount $\phi_T$ serving as a target at the current temperature T of the liquid crystal layer 12, and a value which is preferably input to the digital-analog converter unit 28.

Figure 12:
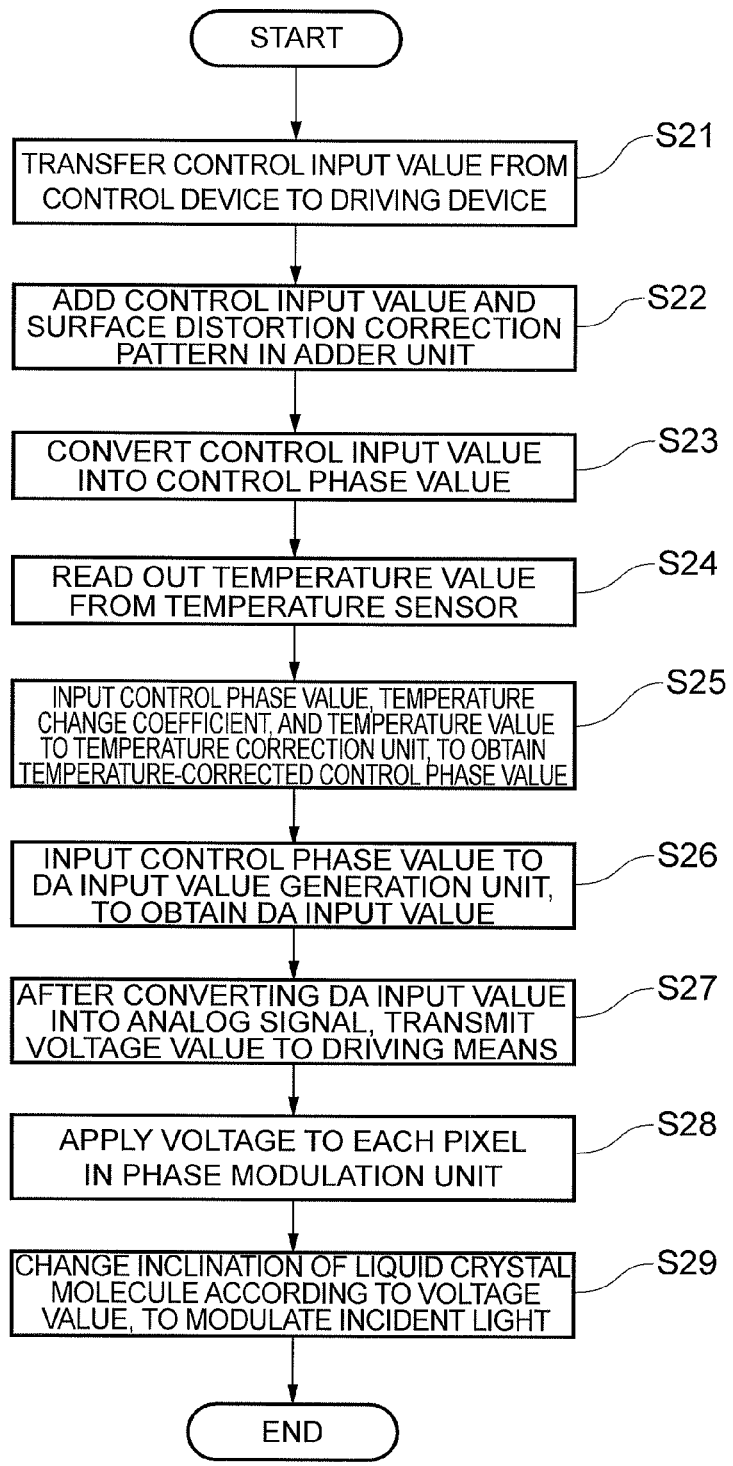
FIG. 12 is a flowchart showing a spatial light modulation method according to an embodiment.

Next, a spatial light modulation method of the present embodiment using the temperature change coefficient α, the polynomial approximate formula (7) and its coefficients $x_0$ to $x_m$ will be described with reference to FIG. 12. FIG. 12 is a flowchart showing the spatial light modulation method of the present embodiment.

First, the phase pattern 33a stored in the hard disk 33 is converted into a control input value S1 in the control device 30A, and this control input value S1 is transferred from the control device 30A to the driving device 20A (Step S21). Next, this control input value S1 and the surface distortion correction pattern data 23a stored in the nonvolatile storage element 23 of the driving device 20A are added in the adder unit 24, to generate a control input value S2 (Step S22). Then, a control phase value $\phi_T$ which is a target value of a phase modulation amount in the phase modulation unit 10 is generated based on the control input value S2 in the phase conversion unit 25 (Step S23). Further, a current temperature of the phase modulation unit 10 detected by the temperature sensor 17 is read out by the temperature sensor processing unit 29 (Step S24, a temperature acquisition step). In addition, this Step S24 may be carried out in parallel with the above-described steps S21 to S23.

Next, the temperature change coefficient data 23b stored in the nonvolatile storage element 23, the current temperature value Ts read out by the temperature sensor processing unit 29, and the control phase value $\phi_T$ are provided for the temperature correction unit 26. In the temperature correction unit 26, a calculation of a control phase value $\phi_0$ (at the reference temperature T0) in which the effect by a temperature change in the liquid crystal layer 12 is corrected is carried out by use of the aforementioned formula (5) (Step S25, a correction calculation step).

Next, the polynomial approximate formula data 23c and the coefficient data 23d thereof stored in the nonvolatile storage element 23 are provided for the DA input value generation unit 27. In the DA input value generation unit 27, a calculation of a DA input value $y_0$ preferable for obtaining the control phase value $\phi_T$ is carried out by use of the formula (the aforementioned formula (7)) shown in the polynomial approximate formula data 23c (Step S26, a DA input calculation step). Then, an analog voltage V for each pixel which is applied to the respective pixels of the phase modulation unit 10 is generated based on the DA input value $y_0$ in the digital-analog converter unit 28 (Step S27). These analog voltages V are transmitted to the driving means 28a. Then, these analog voltages V are output from the driving means 28a to the phase modulation unit 10, to be applied to the respective pixel electrodes 13a (Step S28, a voltage application step). In the phase modulation unit 10, the inclination of the liquid crystal molecules 12a changes according to a level of the applied voltage V, to cause a change in refractive index. As a result, the phase distribution corresponding to the desired phase pattern 33a is spatially expressed, thereby modulating the phase of the incident light (Step S29).

The effects obtained by the spatial light modulation device 1A and the spatial light modulation method of the present embodiment which have been described above will be described. In the spatial light modulation device 1A and the spatial light modulation method, the nonvolatile storage element 23 of the driving device 20A stores one coefficient α included in a function (first function) expressing the correlation between a temperature change amount in the liquid crystal layer 12 and a variation in phase modulation amount in the liquid crystal layer 12. The inventors have found that a function expressing the correlation between a temperature change amount in the liquid crystal layer 12 and a variation in phase modulation amount is determined in advance (refer to the above-described formula (4)), and the coefficient α thereof is stored, thereby it is possible to preferably correct the variation in phase modulation amount by the temperature change without using a large number of LUTs. That is, in the spatial light modulation device 1A and the spatial light modulation method, the driving device 20A carries out a calculation for correcting a level of the applied voltage V by use of a temperature indicated by a temperature signal Stemp provided from the temperature sensor 17 and the one coefficient α. Thereby, it is possible to provide a spatial light modulation device and a spatial light modulation method in which it is possible to decrease a necessary storage capacity, which makes its production easy. Moreover, different from the case where an LUT which is a discrete data aggregate is used, it is possible to continuously obtain an applied voltage value corresponding to a desired phase modulation amount, so as to correspond to a temperature change in the liquid crystal layer 12. Accordingly, it is possible to correct the phase modulation characteristics at small temperature intervals, for example, 1° C. or 0.1° C., and it is possible to improve the accuracy of an applied voltage value with respect to a desired phase modulation amount.

Further, in this spatial light modulation device, the nonvolatile storage element 23 of the driving device 20A stores a plurality of coefficients $x_0$ to $x_m$ included in a nonlinear function (refer to the above-described formula (6)) expressing the correlation between an applied voltage and a phase modulation amount. Because the relationship between an applied voltage and a phase modulation amount is nonlinear, conventionally, LUTs have been widely used in order to convert a phase modulation amount indicated value into an applied voltage. However, in an LUT, for example, in the case where integer values of input values such as 0, 1, . . . , 255 are made to correspond to the phase modulation amounts 0 to $2\pi$ (rad) when the liquid crystal layer 12 is at a high temperature, input values corresponding to the phase modulation amounts 0 to $2\pi$ (rad) are decreased (for example, 0, 1, . . . , 200) when the liquid crystal layer 12 is at a low temperature. In this way, in the case where LUTs are used, the problem that a phase modulation amount allocated to the minimum unit of an input value differs depending on a temperature occurs. Meanwhile, in accordance with the spatial light modulation device 1A and the spatial light modulation method of the present embodiment, a function of an applied voltage and a phase modulation amount in a nonlinear relationship is determined in advance, and the coefficients $x_0$ to $x_m$ thereof are used along with the above-described coefficient α, thereby it is possible to always keep the relationship between a control input value and a phase modulation amount constant regardless of the temperature of the liquid crystal layer 12.

Further, in the spatial light modulation device 1A and the spatial light modulation method of the present embodiment, the temperature correction unit 26 corrects a control phase value by use of a temperature change coefficient α which is a proportionality coefficient between a temperature change amount δ of the liquid crystal layer 12 and a variation γ in phase modulation amount. The inventors have found, as shown in FIG. 9, that a temperature change amount δ and a variation γ in phase modulation amount have a pronounced proportional relationship (form a linear function) in a given applied voltage range A. By use of the slope (temperature change coefficient) α, it is possible to very easily correct a control phase value without storing large volumes of data.

That is, in accordance with this spatial light modulation device 1A and the spatial light modulation method, it is possible to easily correct a variation in phase modulation amount by a temperature change in the liquid crystal layer 12.

In the present embodiment, the surface distortion correction pattern data 23a is stored in the nonvolatile storage element 23 of the driving device 20A. However, the surface distortion correction pattern data may be stored on the hard disk 33 of the control device 30A. In that case, it is preferable that the function of the adder unit 24 be realized by the central processing unit 31 and the memory 32 of the control device 30B.

Further, in the present embodiment, the desired phase pattern 33a is stored on the hard disk 33 of the control device 30A. However, the desired phase pattern may be stored in the nonvolatile storage element 23 of the driving device 20A. Even in that case, the control device 30A has a function of providing the trigger signal Str used for generating a vertical synchronizing signal and a horizontal synchronizing signal required for driving the phase modulation unit 10 to the driving device 20A.

Further, in the present embodiment, the phase modulation unit 10, the driving device 20A, and the control device 30A respectively have a housing independent of each other. However, the phase modulation unit 10 and the driving device 20A may be housed in a common housing. Or, the phase modulation unit 10, the driving device 20A, and the control device 30A may be all housed in a common housing.

Further, in the present embodiment, the phase modulation unit 10 may further have means (for example, a fan, a Peltier element, or the like) for making a temperature of the liquid crystal layer 12 controllable. With this, it is possible to decrease a range of temperature changes in the liquid crystal layer 12, and therefore, for example, it suffices to correct a variation of several degrees C. with respect to the reference temperature T0 by the temperature correction unit 26, which makes it possible to correct a variation in phase modulation amount by a temperature change in the liquid crystal layer 12 with higher accuracy.

Further, in the present embodiment, the temperature correction unit 26 corrects a control input value based on the formula (5). However, depending on a width of a range of voltages applied to the pixel electrodes 13a, the relationship between a temperature change amount δ and a variation γ in phase modulation amount may be nonlinear in some cases. In that case, it is preferable to determine coefficients $\beta_1$ to $\beta_n$ of the following approximate formula (8) in this nonlinear relationship in place of the coefficient α of the formula (4) in Step S13 described above.

[Formula 12]

$$\gamma = \beta_n \delta^n + \ldots + \beta_1 \delta + c \qquad (8)$$

Then, it is preferable that these coefficients $\beta_1$ to $\beta_n$ be set as temperature change coefficients of the temperature change coefficient data 23b. Further, it is preferable that the temperature correction unit 26 perform a calculation of a control phase value $\phi_0$ in which the effect by a temperature change in the liquid crystal layer 12 is corrected by use of the following temperature correction formula (9) in place of the above-described temperature correction formula (5). In addition, in the formula (9), T is a current temperature of the phase modulation unit 10, T0 is a reference temperature (a temperature during inspection in one example) of the phase modulation unit 10, and $\phi_T$ is a control phase value for obtaining a desired phase modulation amount at the current temperature T.

[Formula 13]

$$\phi_0 = \frac{\phi_T}{100 - (T - T0) \times \beta_1 - \ldots - (T - T0)^n \times \beta_n} \times 100 \qquad (9)$$

By performing temperature correction by use of such nonlinear coefficients, it is possible to perform phase modulation with higher accuracy (for example, in units of 1° of phase, in units of 0.1°, or in units of 0.01°) regardless of the temperature change in the liquid crystal layer 12.

(First Modification)

Figure 13:
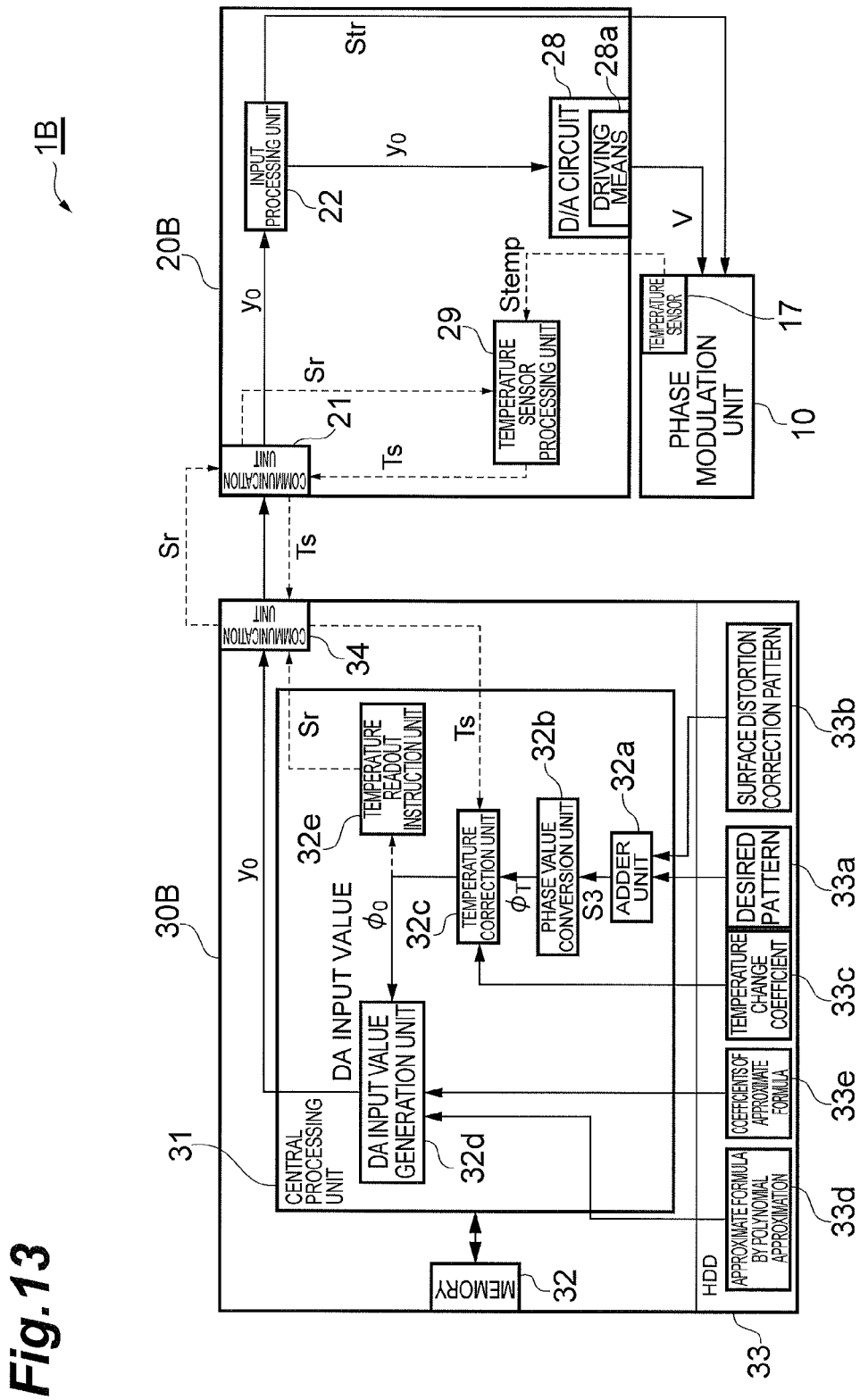
FIG. 13 is a block diagram showing a configuration of a spatial light modulation device that is a first modification.

FIG. 13 is a block diagram showing a configuration of a spatial light modulation device 1B that is a first modification of the above-described embodiment. As shown in FIG. 13, the spatial light modulation device 1B according to the present modification includes, in addition to the phase modulation unit 10, a driving device 20B and a control device 30B serving as a voltage generation unit. In addition, because the configuration of the phase modulation unit 10 is the same as the configuration of the phase modulation unit 10 of the above-described embodiment, the detailed descriptions thereof will be omitted.

The control device 30B is preferably realized by, for example, an electronic computer or the like having the central processing unit 31, the memory 32, and the hard disk 33 in the same way as the control device 30A of the above-described embodiment. However, in this modification, the hard disk 33 stores not only the desired phase pattern 33a, but also surface distortion correction pattern data 33b, temperature change coefficient data 33c, polynomial approximate formula data 33d, and coefficient data 33e thereof. The surface distortion correction pattern data 33b is data corresponding to the surface distortion correction pattern data 23a of the above-described embodiment, and data for correcting surface distortion generated on the surface of the first electrode 13 at the time of making up circuit elements around the pixel electrodes 13a on the silicon substrate 11 by a phase difference provided by the liquid crystal layer 12. Further, the temperature change coefficient data 33c is data corresponding to the temperature change coefficient data 23b of the above-described embodiment, and data on coefficients for correcting a variation in the relationship between an applied voltage to the pixel electrodes 13a and a phase modulation amount by a temperature change in the liquid crystal layer 12. The polynomial approximate formula data 33d and the coefficient data 33e thereof are data corresponding to the polynomial approximate formula data 23c and the coefficient data 23d thereof of the above-described embodiment, and data for correcting the nonlinearity of the liquid crystal layer 12, i.e., the nonlinearity between a level of voltage to be applied to each pixel electrode 13a and a phase modulation amount.

As shown in FIG. 13, the central processing unit 31 realizes an adder unit 32a, a phase conversion unit 32b, a temperature correction unit 32c, a DA input value generation unit 32d, and a temperature readout instruction unit 32e by reading a predetermined program stored in the memory 32. The adder unit 32a reads out the phase pattern 33a and the surface distortion correction pattern data 33b from the hard disk 33, and adds these one to another to generate a control input value S3. The phase conversion unit 32b converts the control input value S3 into a control phase value $\phi_T$ which is a target value of a phase modulation amount in the phase modulation unit 10 by use of the aforementioned formula (1). The temperature readout instruction unit 32e generates a signal Sr for requesting data on a temperature of the liquid crystal layer 12 to the driving device 20B. This signal Sr is transmitted to the temperature sensor processing unit 29 of the driving device 20B via the communication unit 34. The temperature correction unit 32c reads out the temperature change coefficient data 33c from the hard disk 33 and receives the current temperature value Ts of the phase modulation unit 10 from the driving device 20B, and corrects the control phase value $\phi_T$ based on these data to calculate a control phase value $\phi_0$. In addition, this correction calculation is the same as the calculation carried out by the temperature correction unit 26 in the above-described embodiment. The DA input value generation unit 32d reads out the polynomial approximate formula data 33d and the coefficient data 33e thereof from the hard disk 33, to calculate a DA input value $y_0$ from the control phase value $\phi_0$. The DA input value generation unit 32d provides the DA input value $y_0$ to the driving device 20B via the communication unit 34.

The driving device 20B has the communication unit 21, the input processing unit 22, the digital-analog converter unit 28, and the temperature sensor processing unit 29. The configurations and operations thereof are the same as those in the above-described embodiment. In addition, the driving device 20B of the present modification does not have the nonvolatile storage element 23, the adder unit 24, the temperature correction unit 26, and the DA input value generation unit 27 in the above-described embodiment. These components are included in the control device 30B which has been already described.

Figure 14:
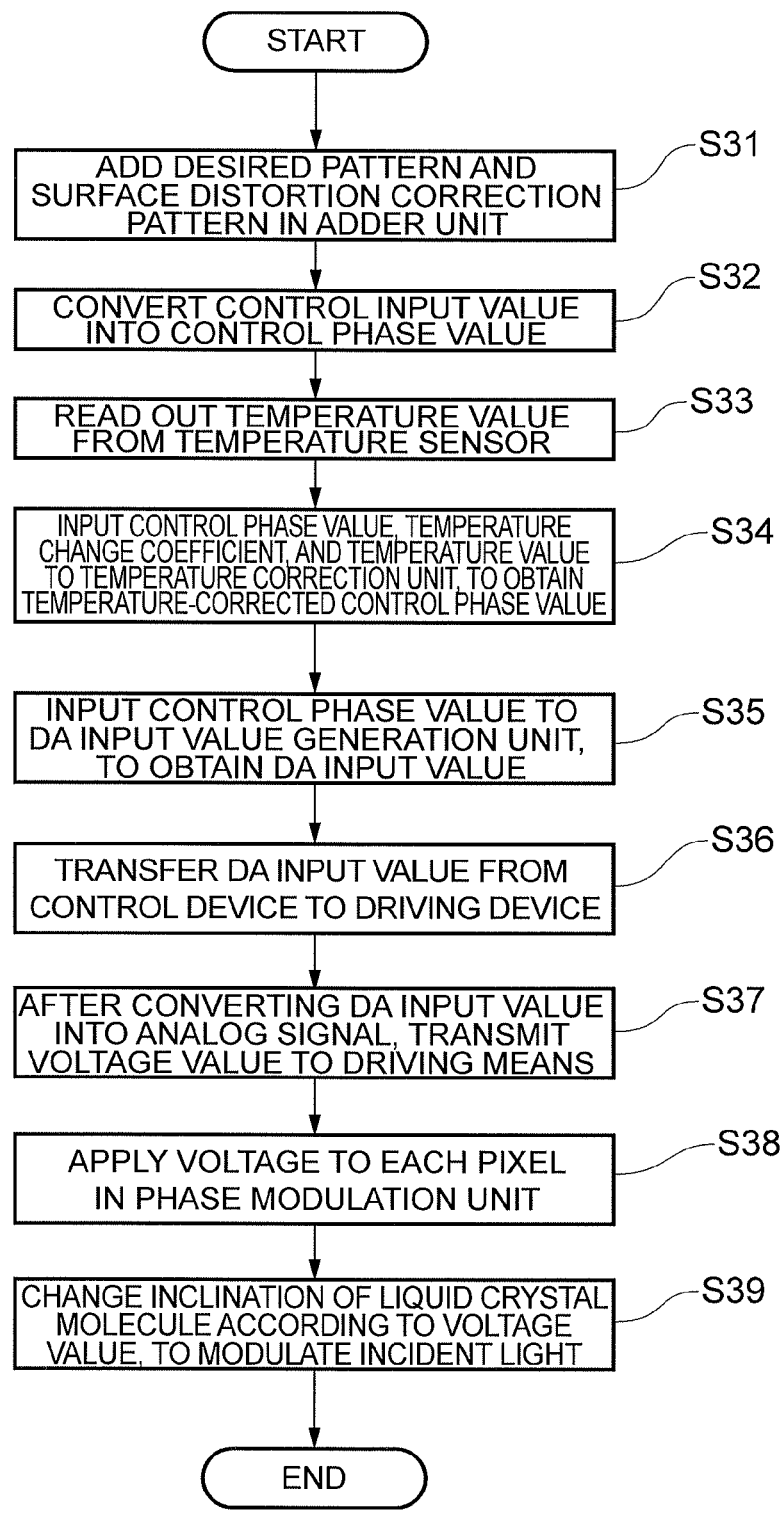
FIG. 14 is a flowchart showing a spatial light modulation method according to the first modification.

FIG. 14 is a flowchart showing a spatial light modulation method according to the present modification. Hereinafter, the operations of the spatial light modulation method and the spatial light modulation device 1B according to the present modification will be described with reference to FIG. 14.

First, the phase pattern 33a and the surface distortion correction pattern data 33b stored in the hard disk 33 are read out by the central processing unit 31, and these are added one to another, to generate a control input value S3 (Step S31). Then, based on the control input value S3, a control phase value $\phi_T$ which is a target value of a phase modulation amount in the phase modulation unit 10 is generated in the phase conversion unit 32b (Step S32). Further, a temperature signal Stemp of a current temperature of the liquid crystal layer 12 detected by the temperature sensor 17 is transmitted to the temperature sensor processing unit 29, and a temperature value Ts indicated by the temperature signal Stemp is transmitted to the central processing unit 31 via the communication unit 34 (Step S33, a temperature acquisition step). In addition, this Step S33 may be carried out in parallel with the above-described Steps S31 and S32.

Next, the temperature change coefficient data 33c stored in the hard disk 33 and the current temperature value Ts are read out by the central processing unit 31, and the calculation shown in the above-described formula (5) is carried out on the control input value S3, thereby calculating a control phase value $\phi_0$ in which the effect by a temperature change in the liquid crystal layer 12 is corrected (at the reference temperature T0) (Step S34, a correction calculation step).

Next, the polynomial approximate formula data 33d and the coefficient data 33e thereof stored in the hard disk 33 are provided for the DA input value generation unit 32d. In the DA input value generation unit 32d, a DA input value $y_0$ preferable for obtaining a control phase value $\phi_T$ is calculated by use of the formula (the aforementioned formula (7)) shown in the polynomial approximate formula data 33d (Step S35, a DA input calculation step). This DA input value $y_0$ is transferred from the control device 30B to the driving device 20B (Step S36). Then, an analog voltage V for each pixel which is applied to the respective pixels of the phase modulation unit 10 is generated based on the DA input value $y_0$ in the digital-analog converter unit 28 (Step S37). These analog voltages V are transmitted to the driving means 28a. Then, these analog voltages V are output from the driving means 28a to the phase modulation unit 10, to be applied to the respective pixel electrodes 13a (Step S38, a voltage application step). In the phase modulation unit 10, the inclination of the liquid crystal molecules 12a changes according to a level of the applied voltage V, to cause a change in refractive index. As a result, the phase distribution corresponding to the desired phase pattern 33a is spatially expressed, thereby modulating the phase of the incident light (Step S39).

In accordance with the spatial light modulation device 1B and the spatial light modulation method according to the present modification described above, in the same way as the above-described embodiment, because the temperature correction unit 32c corrects a control phase value by use of the temperature change coefficient, it is possible to easily correct a variation in phase modulation amount by a temperature change in the liquid crystal layer 12. Moreover, it is possible to decrease a necessary storage capacity, which makes its production easy, and it is possible to improve the accuracy of an applied voltage value with respect to a desired phase modulation amount. Further, because a function of an applied voltage and a phase modulation amount in a nonlinear relationship is stored in advance, and the coefficients thereof are used along with the above-described temperature change coefficient, it is possible to always keep the relationship between a control input value and a phase modulation amount constant regardless of the temperature of the liquid crystal layer 12.

(Second Modification)

Figure 15:
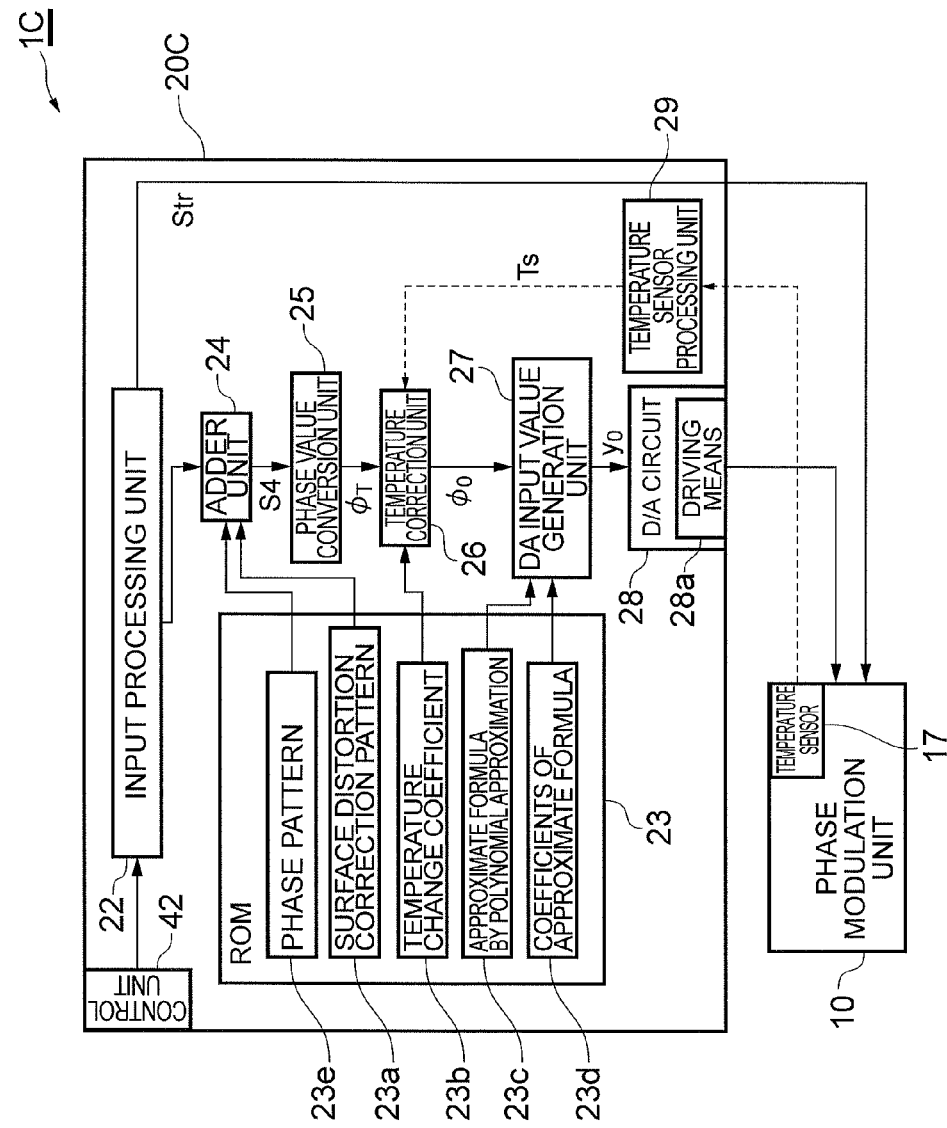
FIG. 15 is a block diagram showing a configuration of a spatial light modulation device that is a second modification.

FIG. 15 is a block diagram showing a configuration of a spatial light modulation device 1C that is a second modification of the above-described embodiment. As shown in FIG. 15, the spatial light modulation device 1C according to the present modification includes the phase modulation unit 10, and a driving device 20C serving as a voltage generation unit. Between these, the configuration of the phase modulation unit 10 is the same as the configuration of the phase modulation unit 10 of the above-described embodiment.

The driving device 20C has a control unit 42. The control unit 42 is preferably realized by, for example, an electronic computer or the like having a central processing unit (CPU), a memory, and a hard disk. Further, the driving device 20C has the input processing unit 22, the nonvolatile storage element 23, the adder unit 24, the phase conversion unit 25, the temperature correction unit 26, the DA input value generation unit 27, the digital-analog converter unit 28, and the temperature sensor processing unit 29.

The input processing unit 22 generates a trigger signal Str for generating a vertical synchronizing signal and a horizontal synchronizing signal based on the signal received from the control unit 42. The nonvolatile storage element 23 stores a desired phase pattern 23e, in addition to the surface distortion correction pattern data 23a, the temperature change coefficient data 23b, the polynomial approximate formula data 23c, and the coefficient data 23d thereof. The phase pattern 23e corresponds to the phase pattern 33a in the above-described embodiment.

The adder unit 24 reads out the surface distortion correction pattern data 23a and the phase pattern 23e from the nonvolatile storage element 23, and adds these one to another to generate a surface-distortion-corrected control input value S4. The phase conversion unit 25 converts the control input value S4 into a control phase value $\phi_T$ which is a target value of a phase modulation amount in the phase modulation unit 10 by use of the aforementioned formula (1). The temperature correction unit 26 performs predetermined arithmetic processing on the control phase value $\phi_T$ based on the temperature change coefficient data 23b and the temperature value Ts obtained from the temperature sensor processing unit 29, thereby generating a temperature-corrected control phase value $\phi_0$. The DA input value generation unit 27 calculates a DA input value $y_0$ from the control phase value $\phi_0$ by use of the polynomial approximate formula data 23c and the coefficient data 23d thereof. The digital-analog converter unit 28 generates an analog voltage V for each pixel which is applied to the respective pixels of the phase modulation unit 10 based on the DA input value $y_0$. These analog voltages V are output to the phase modulation unit 10 through the driving means 28a, to be applied to the respective pixel electrodes 13a (refer to FIG. 2).

In accordance with the spatial light modulation device 1C according to the present modification described above, in the same way as the above-described embodiment, because the temperature correction unit 26 corrects a control phase value by use of a temperature change coefficient, it is possible to easily correct a variation in phase modulation amount by a temperature change in the liquid crystal layer 12. Moreover, it is possible to decrease a necessary storage capacity, which makes its production easy, and it is possible to improve the accuracy of an applied voltage value with respect to a desired phase modulation amount. Further, because a function of an applied voltage and a phase modulation amount in a nonlinear relationship is stored in advance, and the coefficients thereof are used along with the above-described temperature change coefficient, it is possible to always keep the relationship between a control input value and a phase modulation amount constant regardless of the temperature of the liquid crystal layer 12.

(Third Modification)

Figure 16:
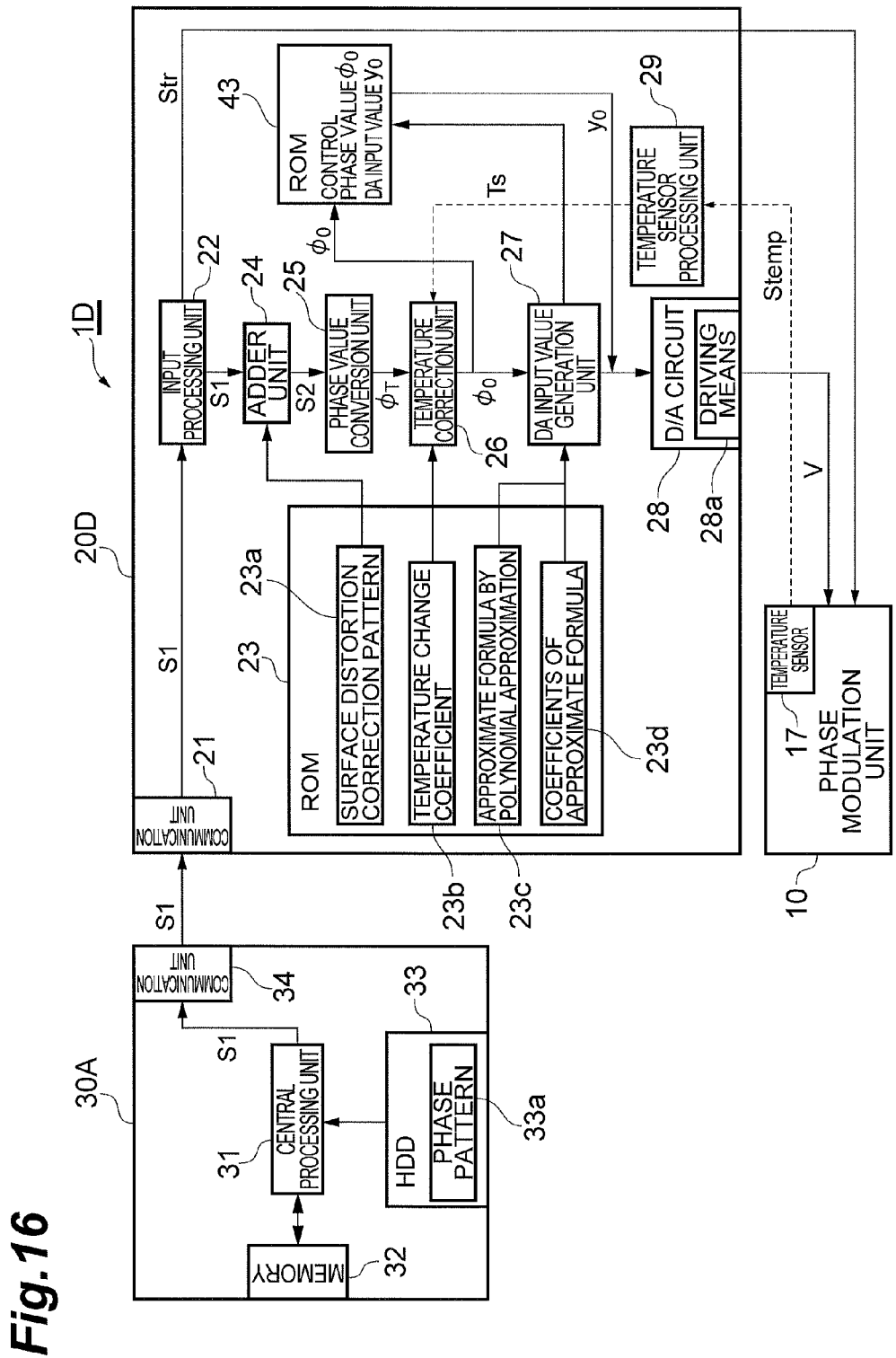
FIG. 16 is a block diagram showing a configuration of a spatial light modulation device that is a third modification.

FIG. 16 is a block diagram showing a configuration of a spatial light modulation device 1D that is a third modification of the above-described embodiment. As shown in FIG. 16, the spatial light modulation device 1D according to the present modification includes the phase modulation unit 10, and a driving device 20D and the control device 30A serving as a voltage generation unit. Among these, the configurations of the phase modulation unit 10 and the control device 30A are the same as the configuration of the phase modulation unit 10 of the above-described embodiment.

Moreover, the driving device 20D of the present modification further has a nonvolatile storage element 43 in addition to the configuration of the driving device 20A of the above-described embodiment. The nonvolatile storage element 43 stores a control phase value $\phi_0$ calculated by the temperature correction unit 26, and a DA input value $y_0$ calculated based on the control phase value $\phi_0$ by the DA input value generation unit 27. The temperature correction unit 26 of the present modification calculates a control phase value $\phi_0$, and thereafter outputs the control phase value $\phi_0$ to the DA input value generation unit 27, and makes the nonvolatile storage element 43 store the control phase value $\phi_0$. The DA input value generation unit 27 refers to the nonvolatile storage element 43 before performing a calculation for a DA input value $y_0$, and in the case where there is a corresponding DA input value $y_0$, reads out this DA input value $y_0$ without performing a calculation, and outputs the value to the digital-analog converter unit 28. Further, in the case where there is no corresponding DA input value $y_0$ in the nonvolatile storage element 43, the DA input value generation unit 27 makes the nonvolatile storage element 43 store the calculated DA input value $y_0$.

Figure 17:
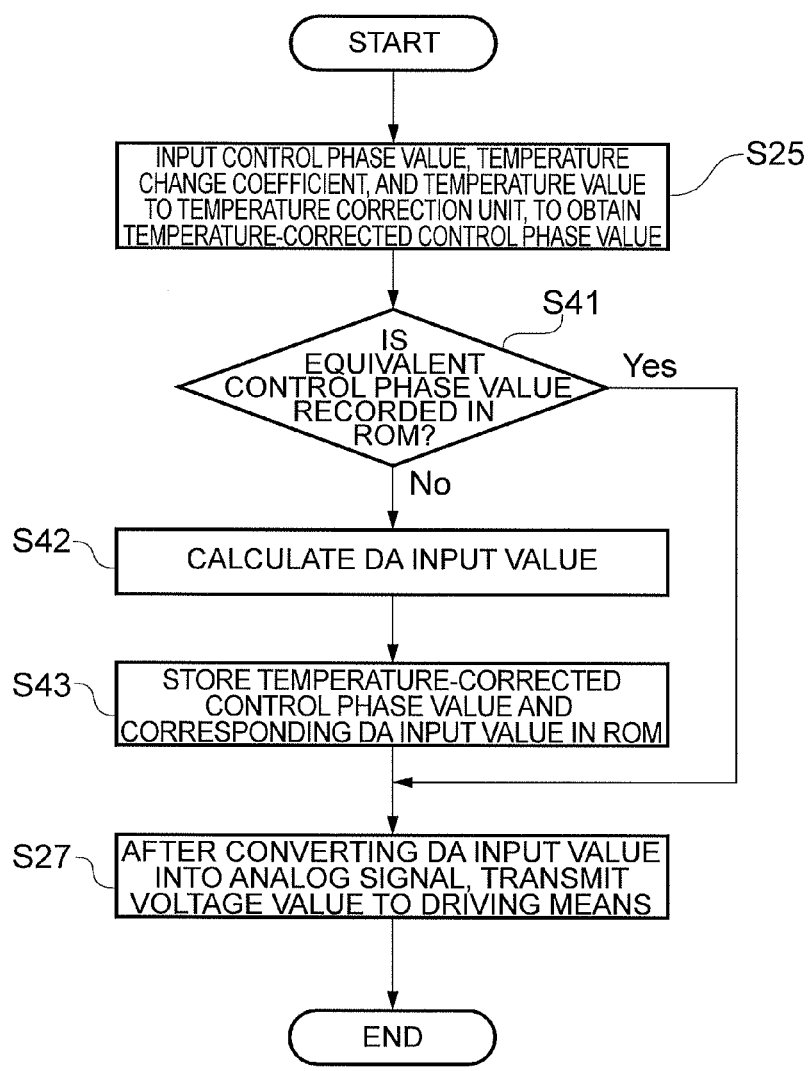
FIG. 17 is a flowchart showing a spatial light modulation method according to the third modification.
Figure 18:
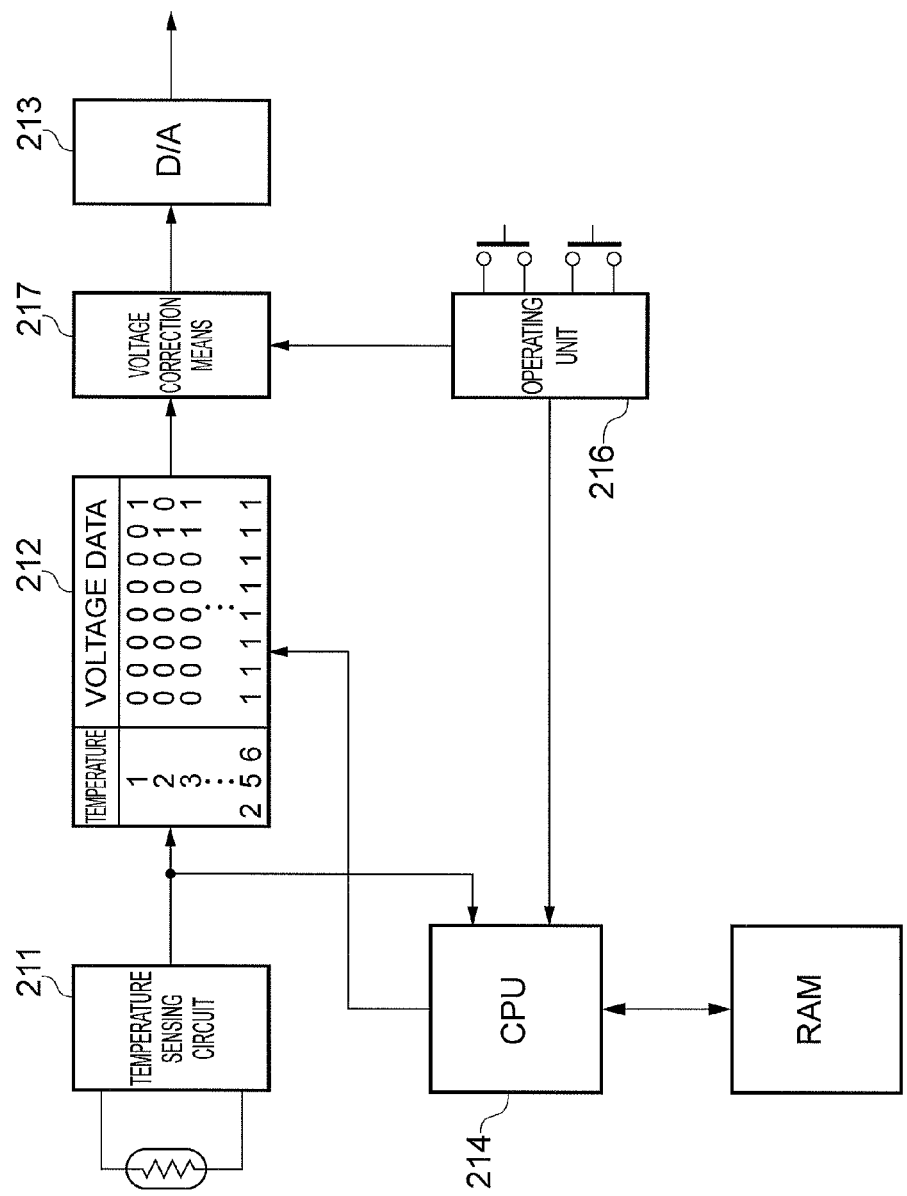
FIG. 18 is a block diagram showing a configuration of a device described in Patent Document 1.
Figure 19:
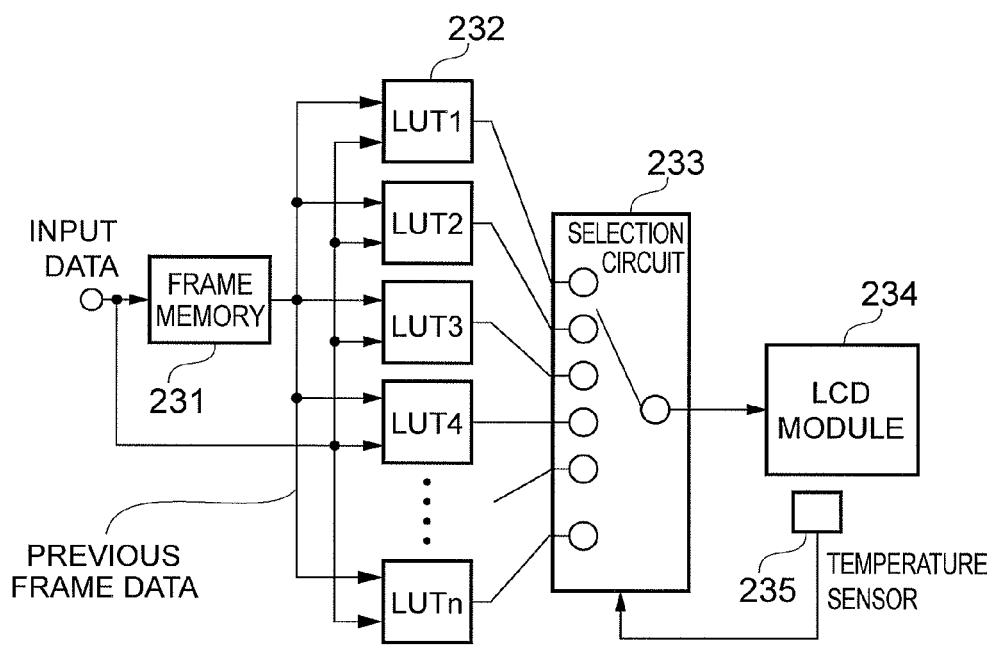
FIG. 19 is a block diagram showing a configuration of a liquid crystal panel driving device described in Patent Document 2.
Figure 20:
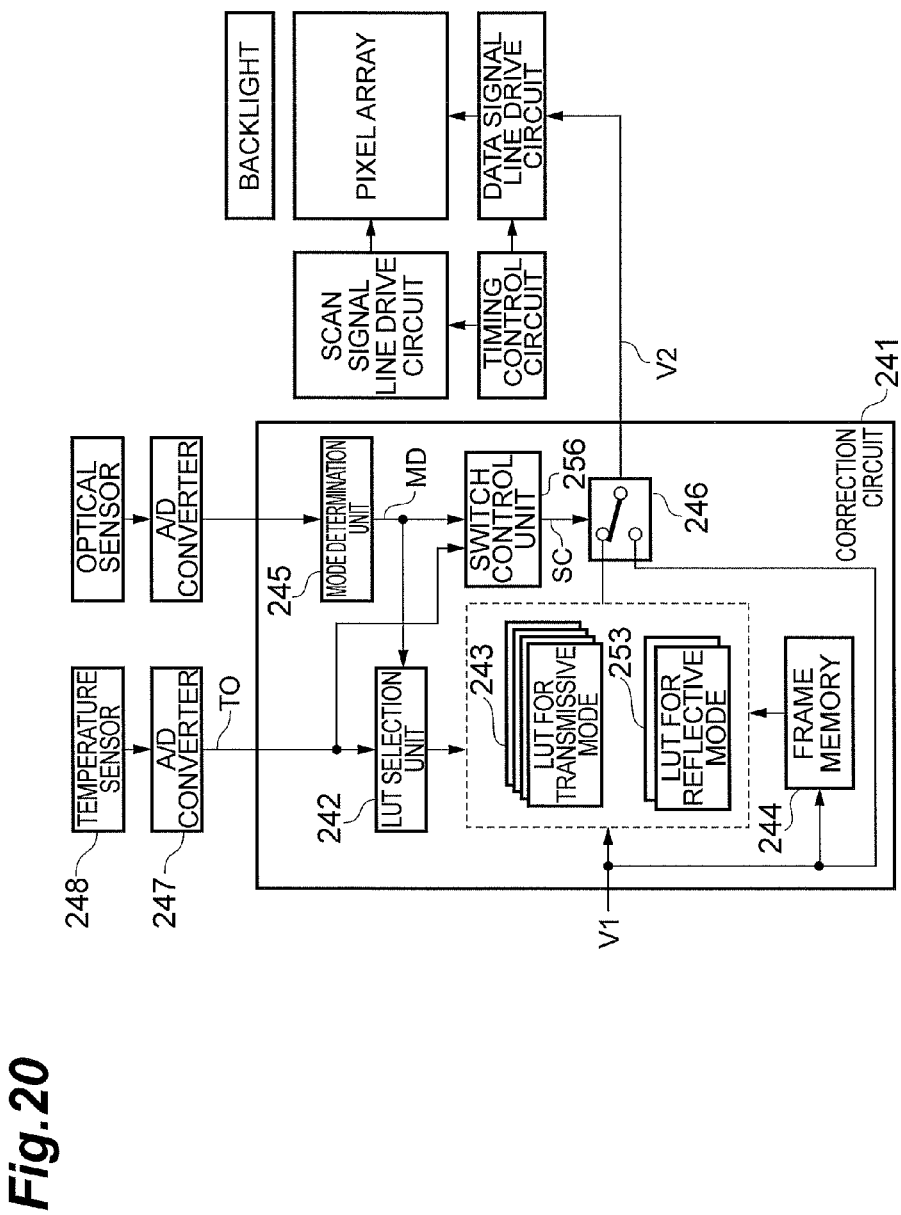
FIG. 20 is a block diagram showing a configuration of a liquid crystal display device described in Patent Document 3.

FIG. 17 is a flowchart showing a spatial light modulation method according to the present modification. Hereinafter, the operations of the spatial light modulation method and the spatial light modulation device 1D according to the present modification will be described with reference to FIG. 17. In addition, because the respective steps before correction calculation Step S25 (refer to FIG. 12) in the above-described embodiment, and the respective steps after Step S27 in which an analog voltage is generated in the digital-analog converter unit 28 are the same as those in the above-described embodiment, the illustration thereof is omitted in FIG. 17.

First, in the temperature correction unit 26, a control phase value $\phi_0$ in which the effect by a temperature change in the liquid crystal layer 12 is corrected is calculated by use of the above-described formula (5) (Step S25, a correction calculation step). Next, the DA input value generation unit 27 checks whether or not the control phase value $\phi_0$ is recorded with reference to the nonvolatile storage element 43 (Step S41). In the case where the control phase value $\phi_0$ is not recorded (No in Step S41), in the DA input value generation unit 27, a DA input value $y_0$ is calculated based on the control phase value $\phi_0$ by use of the formula (the aforementioned formula (7))

shown in the polynomial approximate formula data 23c (Step S42). Then, the calculated DA input value $y_0$ is recorded along with the corresponding control phase value $\phi_0$ in the nonvolatile storage element 43 (Step S43). Further, in the case where the control phase value $\phi_0$ is recorded (Yes in Step S41), a DA input value $y_0$ is not calculated in the DA input value generation unit 27. Thereafter, an analog voltage V of each pixel which is applied to the respective pixels of the phase modulation unit 10 is generated based on the DA input value $y_0$ in the digital-analog converter unit 28 (Step S27).

In accordance with the spatial light modulation device 1D and the spatial light modulation method according to the present modification, it is possible to exert, not only the same effects as the above-described embodiment, but also the following effects. That is, in the present modification, the DA input value $y_0$ once calculated in the DA input value generation unit 27 is recorded along with the corresponding control phase value $\phi_0$ in the nonvolatile storage element 43. Accordingly, when the same control phase value $\phi_0$ is again generated, it is possible to omit a repeated calculation in the DA input value generation unit 27, which makes it possible to shorten a processing time.

The spatial light modulation device and the spatial light modulation method according to the present invention are not limited to the embodiment described above, and other various modifications are possible. For example, in the above-described embodiment, the case where the pixel electrodes of the phase modulation unit are two-dimensionally arrayed in a plurality of rows and a plurality of columns has been exemplified, however, the spatial light modulation device in the present invention is not limited to this case, and may have a configuration in which, for example, a plurality of pixel electrodes are one-dimensionally arrayed.

A spatial light modulation device according to the above-described embodiment is a spatial light modulation device which modulates a phase of incident light for each of a plurality of pixels one-dimensionally or two-dimensionally arrayed, and the device includes (1) a liquid crystal layer that modulates a phase of the incident light according to a level of an applied electric field, (2) a temperature sensor that generates a temperature signal which is a signal corresponding to a temperature of the liquid crystal layer, (3) a plurality of pixel electrodes which are provided for each of the plurality of pixels and apply a voltage for generating the applied electric field to the liquid crystal layer, and (4) a voltage generation unit that provides the voltage to the plurality of pixel electrodes. The voltage generation unit has storage means. In this storage means, one or a plurality of first coefficients included in a first function expressing a correlation between a temperature change amount with respect to a reference temperature of the liquid crystal layer and a variation in phase modulation amount in the liquid crystal layer, and a plurality of second coefficients included in a second function which is a nonlinear function expressing a correlation between an applied voltage and a phase modulation amount are stored in advance. The voltage generation unit carries out a calculation for correcting a phase modulation amount indicated value which is a target value of a phase modulation amount by use of a temperature indicated by the temperature signal provided from the temperature sensor, and the one or plurality of first coefficients, thereafter converts the phase modulation amount indicated value into an applied voltage corresponding value by use of the plurality of second coefficients, and provides the voltage corresponding to the applied voltage corresponding value to the plurality of pixel electrodes.

Further, the spatial light modulation device may have a configuration in which the first function is a linear function, and the number of the first coefficients is one. In this case, it is preferable that the range of the voltage is limited to a predetermined range in which it is possible to approximate the first function as a linear function. Further, the spatial light modulation device may have a configuration in which the first function is an n-th order function (n is an integer not less than 2), and the number of the first coefficients is n.

Further, a spatial light modulation method according to the above-described embodiment is a spatial light modulation method which uses a liquid crystal layer that modulates a phase of incident light according to a level of an applied electric field, and a plurality of pixel electrodes which are provided for each of a plurality of pixels one-dimensionally or two-dimensionally arrayed, and apply a voltage for generating the applied electric field to the liquid crystal layer, and the method includes (1) a temperature acquisition step of acquiring a temperature signal which is a signal corresponding to a temperature of the liquid crystal layer from a temperature sensor, (2) a correction calculation step of reading out one or a plurality of first coefficients from storage means which stores in advance the one or plurality of first coefficients included in a first function expressing a correlation between a temperature change amount with respect to a reference temperature of the liquid crystal layer and a variation in phase modulation amount in the liquid crystal layer, and a plurality of second coefficients included in a second function which is a nonlinear function expressing a correlation between an applied voltage and a phase modulation amount, and carrying out a calculation for correcting a phase modulation amount indicated value which is a target value of a phase modulation amount by use of a temperature indicated by the temperature signal, and the one or plurality of first coefficients, (3) a voltage conversion step of reading out the plurality of second coefficients from the storage means, and converting the phase modulation amount indicated value into an applied voltage corresponding value by use of the plurality of second coefficients, and (4) a voltage application step of providing the voltage corresponding to the applied voltage corresponding value to the plurality of pixel electrodes.

Further, the spatial light modulation method may have a configuration in which the first function is a linear function, and the number of the first coefficients is one. In this case, it is preferable that the range of the voltage is limited to a predetermined range in which it is possible to approximate the first function as a linear function. Further, the spatial light modulation method may have a configuration in which the first function is an n-th order function (n is an integer not less than 2), and the number of the first coefficients is n.

Industrial Applicability

The present invention is applicable as a spatial light modulation device and a spatial light modulation method in which it is possible to decrease a necessary storage capacity, which makes its production easy, and it is possible to improve the accuracy of an applied voltage value with respect to a desired phase modulation amount.

Reference Signs List

1A to 1D—spatial light modulation device, 10—phase modulation unit, 11—silicon substrate, 12—liquid crystal layer, 12a—liquid crystal molecule, 13, 14—electrode, 13a—pixel electrode, 15—glass substrate, 16—spacer, 17—temperature sensor, 20A to 20D—driving device, 21—communication unit, 22—input processing unit, 23—nonvolatile storage element, 23a, 33b—surface distortion correction pattern data, 23b, 33c—temperature change coefficient data, 23c, 33d—polynomial approximate formula data, 23d, 33e—coefficient data of polynomial approximate formula, 23e, 33a—phase pattern, 24—adder unit, 25—phase conversion unit, 26—temperature correction unit, 27—DA input value generation unit, 28—digital-analog converter unit, 28a—driving means, 29—temperature sensor processing unit, 30A, 30B—control device, 31—central processing unit, 32—memory, 32a—adder unit, 32b—phase conversion unit, 32c—temperature correction unit, 32d—DA input value generation unit, 32e—temperature readout instruction unit, 33—hard disk, 34—communication unit, 41—basic database, 50A—voltage generation unit, 100—polarization interferometer, 101—temperature control device, 102—half mirror, 103—lens, 104—analyzer, 105—polarizer, 106—light source, 107—light receiving element, A—applied voltage range, S1 to S4—control input value, Stemp—temperature signal, $\phi_T$, $\phi_0$—control phase value (phase modulation amount indicated value).

The invention claimed is:

1. A spatial light modulation device which modulates a phase of incident light for each of a plurality of pixels one-dimensionally or two-dimensionally arrayed, the device comprising:
a liquid crystal layer modulating a phase of the incident light according to a level of an applied electric field;
a temperature sensor generating a temperature signal which is a signal corresponding to a temperature of the liquid crystal layer;
a plurality of pixel electrodes which are provided for each of the plurality of pixels and apply a voltage for generating the applied electric field to the liquid crystal layer; and
a voltage generation unit providing the voltage to the plurality of pixel electrodes, wherein
the voltage generation unit has storage means, and in the storage means, one or a plurality of first coefficients included in a first function expressing a correlation between a temperature change amount with respect to a reference temperature of the liquid crystal layer and a variation in phase modulation amount in the liquid crystal layer, and a plurality of second coefficients included in a second function which is a nonlinear function expressing a correlation between an applied voltage and a phase modulation amount at the reference temperature are stored in advance, and
the voltage generation unit carries out a calculation for correcting a phase modulation amount indicated value which is a target value of a phase modulation amount by use of a temperature indicated by the temperature signal provided from the temperature sensor, and the one or plurality of first coefficients, thereafter converts the phase modulation amount indicated value into an applied voltage corresponding value by use of the plurality of second coefficients, and provides the voltage corresponding to the applied voltage corresponding value to the plurality of pixel electrodes.

2. The spatial light modulation device according to claim 1, wherein the voltage generation unit transforms a desired phase modulation amount into a control input value which is a value for controlling the voltage and whose relationship with the phase modulation amount is able to be handled as linear, and generates the phase modulation amount indicated value based on the control input value.

3. The spatial light modulation device according to claim 1, wherein the voltage generation unit stores the corrected phase modulation amount indicated value and the applied voltage corresponding value calculated based on the phase modulation amount indicated value, and in the case where there is an applied voltage corresponding value corresponding to the corrected phase modulation amount indicated value, without performing a calculation, provides the voltage corresponding to the applied voltage corresponding value to the plurality of pixel electrodes.

4. A spatial light modulation method which uses a liquid crystal layer modulating a phase of incident light according to a level of an applied electric field, and a plurality of pixel electrodes which are provided for each of a plurality of pixels one-dimensionally or two-dimensionally arrayed, and apply a voltage for generating the applied electric field to the liquid crystal layer, the method comprising:
a temperature acquisition step of acquiring a temperature signal which is a signal corresponding to a temperature of the liquid crystal layer from a temperature sensor;
a correction calculation step of reading out one or a plurality of first coefficients from storage means storing in advance the one or plurality of first coefficients included in a first function expressing a correlation between a temperature change amount with respect to a reference temperature of the liquid crystal layer and a variation in phase modulation amount in the liquid crystal layer, and a plurality of second coefficients included in a second function which is a nonlinear function expressing a correlation between an applied voltage and a phase modulation amount at the reference temperature, and carrying out a calculation for correcting a phase modulation amount indicated value which is a target value of a phase modulation amount by use of a temperature indicated by the temperature signal, and the one or plurality of first coefficients;
a voltage conversion step of reading out the plurality of second coefficients from the storage means, and converting the phase modulation amount indicated value into an applied voltage corresponding value by use of the plurality of second coefficients; and
a voltage application step of providing the voltage corresponding to the applied voltage corresponding value to the plurality of pixel electrodes.

5. The spatial light modulation method according to claim 4, wherein, in the correction calculation step, a desired phase modulation amount is transformed into a control input value which is a value for controlling the voltage and whose relationship with the phase modulation amount is able to be handled as linear, and the phase modulation amount indicated value is generated based on the control input value.

6. The spatial light modulation method according to claim 4, wherein, in the voltage conversion step, the corrected phase modulation amount indicated value and the applied voltage corresponding value calculated based on the phase modulation amount indicated value are stored, and in the case where there is an applied voltage corresponding value corresponding to the corrected phase modulation amount indicated value, in the voltage application step, without performing a calculation, the voltage corresponding to the applied voltage corresponding value is provided to the plurality of pixel electrodes.

7. A spatial light modulation device which modulates a phase of incident light for each of a plurality of pixels one-dimensionally or two-dimensionally arrayed, the device comprising:
a liquid crystal layer modulating a phase of the incident light according to a level of an applied electric field;
a temperature sensor generating a temperature signal which is a signal corresponding to a temperature of the liquid crystal layer;

a plurality of pixel electrodes which are provided for each of the plurality of pixels and apply a voltage for generating the applied electric field to the liquid crystal layer; and a voltage generation unit providing the voltage to the plurality of pixel electrodes, wherein the voltage generation unit has storage means, and in the storage means, one or a plurality of first coefficients included in a first function expressing a correlation between a temperature change amount with respect to a reference temperature of the liquid crystal layer and a variation in phase modulation amount in the liquid crystal layer, and a plurality of second coefficients included in a second function which is a nonlinear function expressing a correlation between an applied voltage and a phase modulation amount are stored in advance, and the voltage generation unit carries out a calculation for correcting a phase modulation amount indicated value which is a target value of a phase modulation amount by use of a temperature indicated by the temperature signal provided from the temperature sensor, and the one or plurality of first coefficients, thereafter converts the phase modulation amount indicated value into an applied voltage corresponding value by use of the plurality of second coefficients, and provides the voltage corresponding to the applied voltage corresponding value to the plurality of pixel electrodes, the first function is a linear function, and the number of the first coefficients is one, and the voltage generation unit corrects the phase modulation amount indicated value based on the following formula:

$$\phi_0 = \frac{\phi_T}{(100 - \alpha \times (T - T0))} \times 100$$

(where, T is a temperature indicated by the temperature signal provided from the temperature sensor, T0 is a reference temperature, $\phi_T$ is the phase modulation amount indicated value before correction, $\phi_0$ is the phase modulation amount indicated value after correction, and $\alpha$ is the first coefficient).

8. A spatial light modulation device which modulates a phase of incident light for each of a plurality of pixels one-dimensionally or two-dimensionally arrayed, the device comprising:

a liquid crystal layer modulating a phase of incident light according to a level of an applied electric field;

a temperature sensor generating a temperature signal which is a signal corresponding to a temperature of the liquid crystal layer;

a plurality of pixel electrodes which are provided for each of the plurality of pixels and apply a voltage for generating the applied electric field to the liquid crystal layer;

a voltage generation unit providing the voltage to the plurality of pixel electrodes, wherein the voltage generation unit has storage means, and in the storage means, one or a plurality of first coefficients included in a first function expressing a correlation between a temperature change amount with respect to a reference temperature of the liquid crystal layer and a variation in phase modulation amount in the fluid crystal layer, and a plurality of second coefficients included in a second function which is a nonlinear function expressing a correlation between an applied voltage and a phase modulation amount are stored in advance, and the voltage generation unit carries out a calculation for correcting a phase modulation amount indicated value which is a target value of a phase modulation amount by use of a temperature indicated b the temperature signal provided from the temperature sensor and the one or plurality of first coefficients, thereafter converts the phase modulation amount indicated value into an as lied voltage corresponding value b use of the plurality of second coefficients and provides the voltage corresponding to the applied voltage corresponding value to the plurality of pixel electrodes, the first function is an n-th order function (n is an integer not less than 2), and the number of the first coefficients is n, and the voltage generation unit corrects the phase modulation amount indicated value based on the following formula:

$$\phi_0 = \frac{\phi_T}{100 - (T - T0) \times \beta_1 - \ldots - (T - T0)^n \times \beta_n} \times 100$$

(where, T is a temperature indicated by the temperature signal provided from the temperature sensor, T0 is a reference temperature, $\phi_T$ is the phase modulation amount indicated value before correction, $\phi_0$ is the phase modulation amount indicated value after correction, and $\beta_1 \ldots \beta_n$ are the n first coefficients).

9. A spatial light modulation method which uses a liquid crystal layer modulating a phase of incident light according to a level of an applied electric field, and a plurality of pixel electrodes which are provided for each of a plurality of pixels one-dimensionally or two-dimensionally arrayed, and apply a voltage for generating the applied electric field to the liquid crystal layer, the method comprising:

a temperature acquisition step of acquiring a temperature signal which is a signal corresponding to a temperature of the liquid crystal layer from a temperature sensor;

a correction calculation step of reading out one or a plurality of first coefficients from storage means storing in advance the one or plurality of first coefficients included in a first function expressing a correlation between a temperature change amount with respect to a reference temperature of the liquid crystal layer and a variation in phase modulation amount in the liquid crystal layer, and a plurality of second coefficients included in a second function which is a nonlinear function expressing a correlation between an applied voltage and a phase modulation amount, and carrying out a calculation for correcting a phase modulation amount indicated value which is a target value of a phase modulation amount by use of a temperature indicated by the temperature signal, and the one or plurality of first coefficients;

a voltage conversion step of reading out the plurality of second coefficients from the storage means, and converting the phase modulation amount indicated value into an applied voltage corresponding value by use of the plurality of second coefficients; and a voltage application step of providing the voltage corresponding to the applied voltage corresponding value to the plurality of pixel electrodes, wherein the first function is a linear function, and the number of the first coefficients is one, and in the correction calculation step, the phase modulation amount indicated value is corrected based on the following formula:

$$\phi_0 = \frac{\phi_T}{(100 - \alpha \times (T - T0))} \times 100$$

(where, T is a temperature indicated by the temperature signal provided from the temperature sensor, T0 is a reference temperature, $\phi_T$ is the phase modulation amount indicated value before correction, $\phi_0$ is the phase modulation amount indicated value after correction, and α is the first coefficient).

10. A spatial light modulation method which uses a liquid crystal layer modulating a phase of incident light according to a level of an applied electric field, and a plurality of pixel electrodes which are provided for each of a plurality of pixels one-dimensionally or two-dimensionally arrayed, and apply a voltage for generating the applied electric field to the liquid crystal layer, the method comprising:

a temperature acquisition step of acquiring a temperature signal which is a signal corresponding to a temperature of the liquid crystal layer from a temperature sensor;

a correction calculation step of reading out one or a plurality of first coefficients from storage means storing in advance the one or plurality of first coefficients included in a first function expressing a correlation between a temperature change amount with respect to a reference temperature of the liquid crystal layer and a variation in phase modulation amount in the liquid crystal layer, and a plurality of second coefficients included in a second function which is a nonlinear function expressing a correlation between an applied voltage and a phase modulation amount, and carrying out a calculation for correcting a phase modulation amount indicated value which is a target value of a phase modulation amount by use of a temperature indicated by the temperature signal, and the one or plurality of first coefficients;

a voltage conversion step of reading out the plurality of second coefficients from the storage means, and converting the phase modulation amount indicated value into an applied voltage corresponding value by use of the plurality of second coefficients: and a voltage application step of providing the voltage corresponding to the applied voltage corresponding value to the plurality of pixel electrodes, wherein the first function is an n-th order function (n is an integer not less than 2), and the number of the first coefficients is n, and in the correction calculation step, the phase modulation amount indicated value is corrected based on the following formula:

$$\phi_0 = \frac{\phi_T}{100 - (T - T0) \times \beta_1 - \ldots - (T - T0)^n \times \beta_n} \times 100$$

(where, T is a temperature indicated by the temperature signal provided from the temperature sensor, T0 is a reference temperature, $\phi_T$ is the phase modulation amount indicated value before correction, $\phi_0$ is the phase modulation amount indicated value after correction, and $\beta_1 \ldots \beta_n$ are the n first coefficients).

* * * * *